(12) United States Patent
Weldon et al.

(10) Patent No.: US 10,503,216 B2
(45) Date of Patent: Dec. 10, 2019

(54) ADJUSTMENT OF MAGNETIC FORCE IN A COMPUTING DEVICE

(71) Applicant: Intel Corporation, Santa Clara, CA (US)

(72) Inventors: Kristin L. Weldon, Dupont, WA (US); Michael S. Brazel, Federal Way, WA (US); Jered H. Wikander, Portland, OR (US); Lily Kolle, Hillsboro, OR (US); Weibo Chen, Hanover, NH (US); Aleksander Magi, Aloha, OR (US); Konstantin I. Kouliachev, Olympia, WA (US); Ralph V. Miele, Hillsboro, OR (US); Richard P. Crawford, Davis, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/242,901

(22) PCT Filed: Mar. 29, 2014

(86) PCT No.: PCT/US2014/032287
§ 371 (c)(1),
(2) Date: Aug. 22, 2016

(87) PCT Pub. No.: WO2015/147885
PCT Pub. Date: Oct. 1, 2015

(65) Prior Publication Data
US 2017/0017273 A1    Jan. 19, 2017

Related U.S. Application Data

(63) Continuation of application No. 14/229,828, filed on Mar. 28, 2014, now abandoned.

(51) Int. Cl.
*G06F 1/16* (2006.01)

(52) U.S. Cl.
CPC .......... *G06F 1/1681* (2013.01); *G06F 1/1654* (2013.01); *G06F 1/1679* (2013.01)

(58) Field of Classification Search
CPC ..... G06F 1/1679; G06F 1/1654; G06F 1/1681
See application file for complete search history.

(56) References Cited

U.S. PATENT DOCUMENTS

| 7,915,986 B2 | 3/2011 | Lu |
| 2007/0025853 A1* | 2/2007 | Chen ........................ G06F 1/162 416/100 |

(Continued)

FOREIGN PATENT DOCUMENTS

| CN | 1450774 A | 10/2003 |
| CN | 101469735 A | 7/2009 |

(Continued)

OTHER PUBLICATIONS

International Search Report and Written Opinion for International Application PCT/US2014/032287 filed Mar. 29, 2014; dated Aug. 27, 2014; 20 pages.

(Continued)

*Primary Examiner* — Ramon M Barrera
(74) *Attorney, Agent, or Firm* — International IP Law Group, P.L.L.C.

(57) ABSTRACT

Techniques for forming and adjusting a magnetic tension mechanism are described herein. A system includes a first magnetic element in a first component of a computing device. The system includes a second magnetic element in a second component of the computing device, wherein the first magnetic component and the second magnetic component are to be held in tension by a magnetic force. The (Continued)

system also includes an adjustment mechanism to adjust the force required to decouple the magnetic elements.

8 Claims, 23 Drawing Sheets

(56) References Cited

U.S. PATENT DOCUMENTS

| | | |
|---|---|---|
| 2007/0133156 A1 | 6/2007 | Ligtenberg et al. |
| 2008/0061565 A1 | 3/2008 | Lee et al. |
| 2010/0238620 A1 | 9/2010 | Fish |
| 2011/0116214 A1 | 5/2011 | Liu et al. |
| 2011/0279954 A1 | 11/2011 | Sendora |
| 2011/0291848 A1 | 12/2011 | Burdenko et al. |
| 2014/0306463 A1 | 10/2014 | Ho |

FOREIGN PATENT DOCUMENTS

| | | |
|---|---|---|
| CN | 201837920 U | 5/2011 |
| CN | 102400601 A | 4/2012 |
| EP | 283626 A1 | 11/2011 |
| JP | 2000038092 A | 2/2000 |
| JP | 2002344593 A | 11/2002 |
| JP | 2006270833 A | 10/2006 |
| JP | 2007126843 A | 5/2007 |
| JP | 2008092081 A | 4/2008 |
| JP | 2009145927 A | 7/2009 |
| JP | 2011187043 A | 9/2011 |
| TW | M462886 U | 10/2013 |
| WO | 2008-013739 A2 | 1/2008 |
| WO | 201087186 | 8/2010 |

OTHER PUBLICATIONS

Grolms, Martin, "Optimizing Actuators with Shape Memory Alloys," Optimizing Actuators with Shape Memory Alloys—MaterialsViews, http://www.advancedsciencenews.com/optimizing-actiiators-with-shape-memoxy-alloys/, Copyright Copyright © 2017 Wiley-VCH, dated viewed Sep. 29, 2017, 1 page, Published USA.

Supplementary Partial European Search Report, EP Application No. EP14887330, date of completion Oct. 30, 2017, 2 pages.

Chinese Office Action and Search Report for Related Chinese Application CN 201380072083.9 dated Sep. 27, 2018, 12 pages.

\* cited by examiner

400A

400B

500A

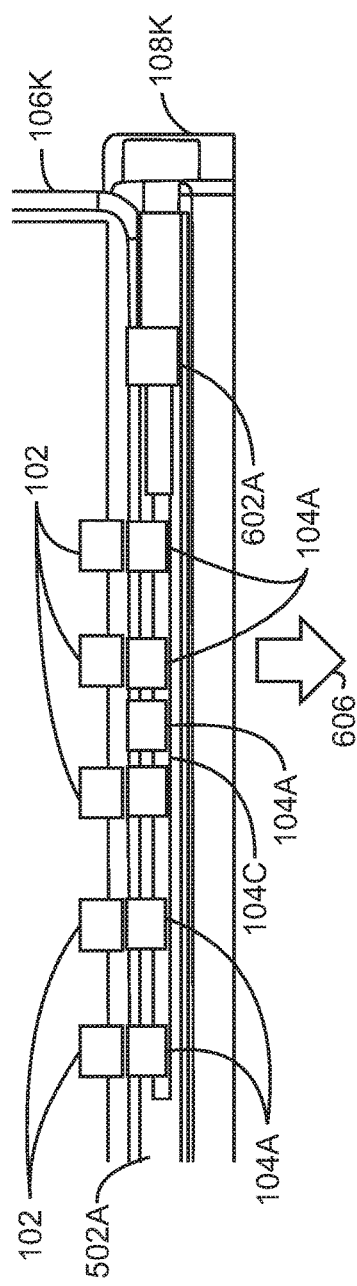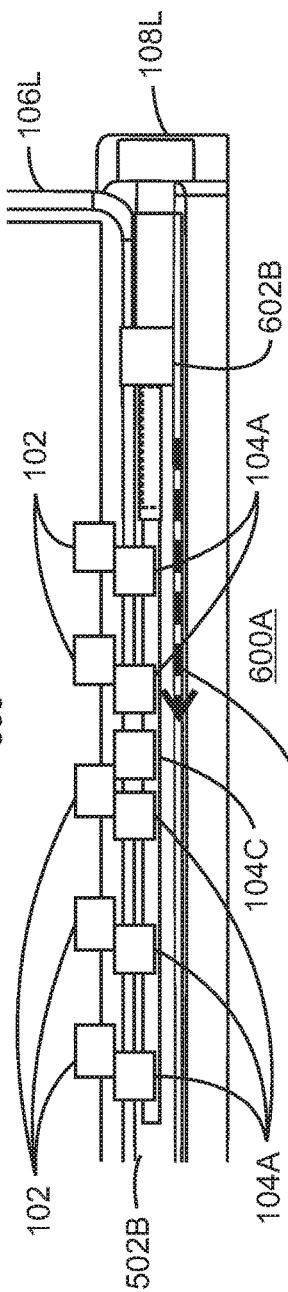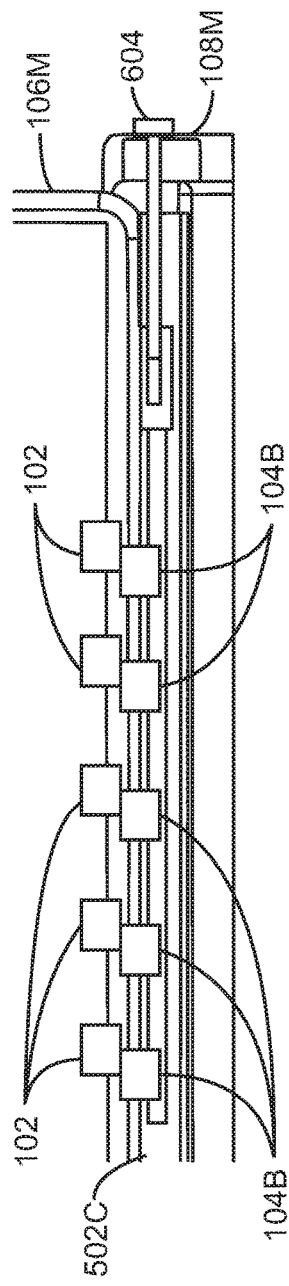

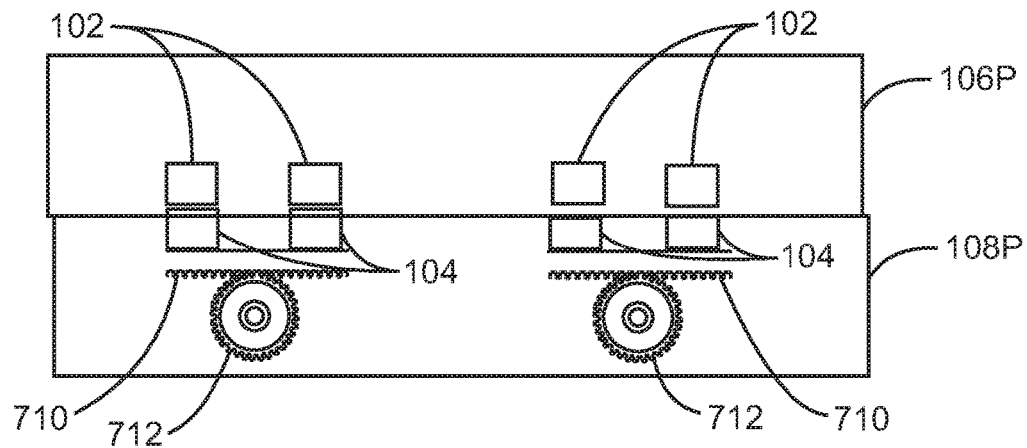
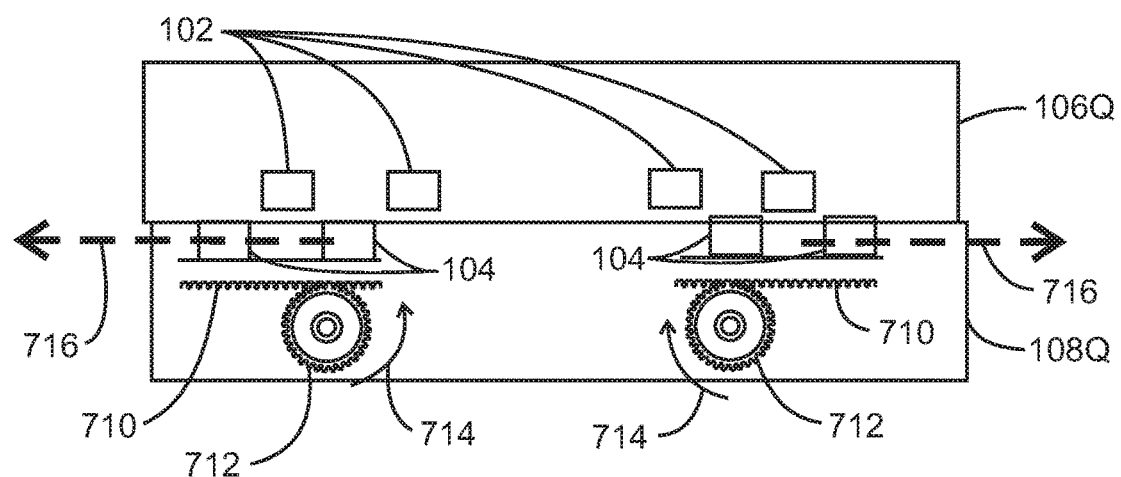
700B
FIG. 7B

700C

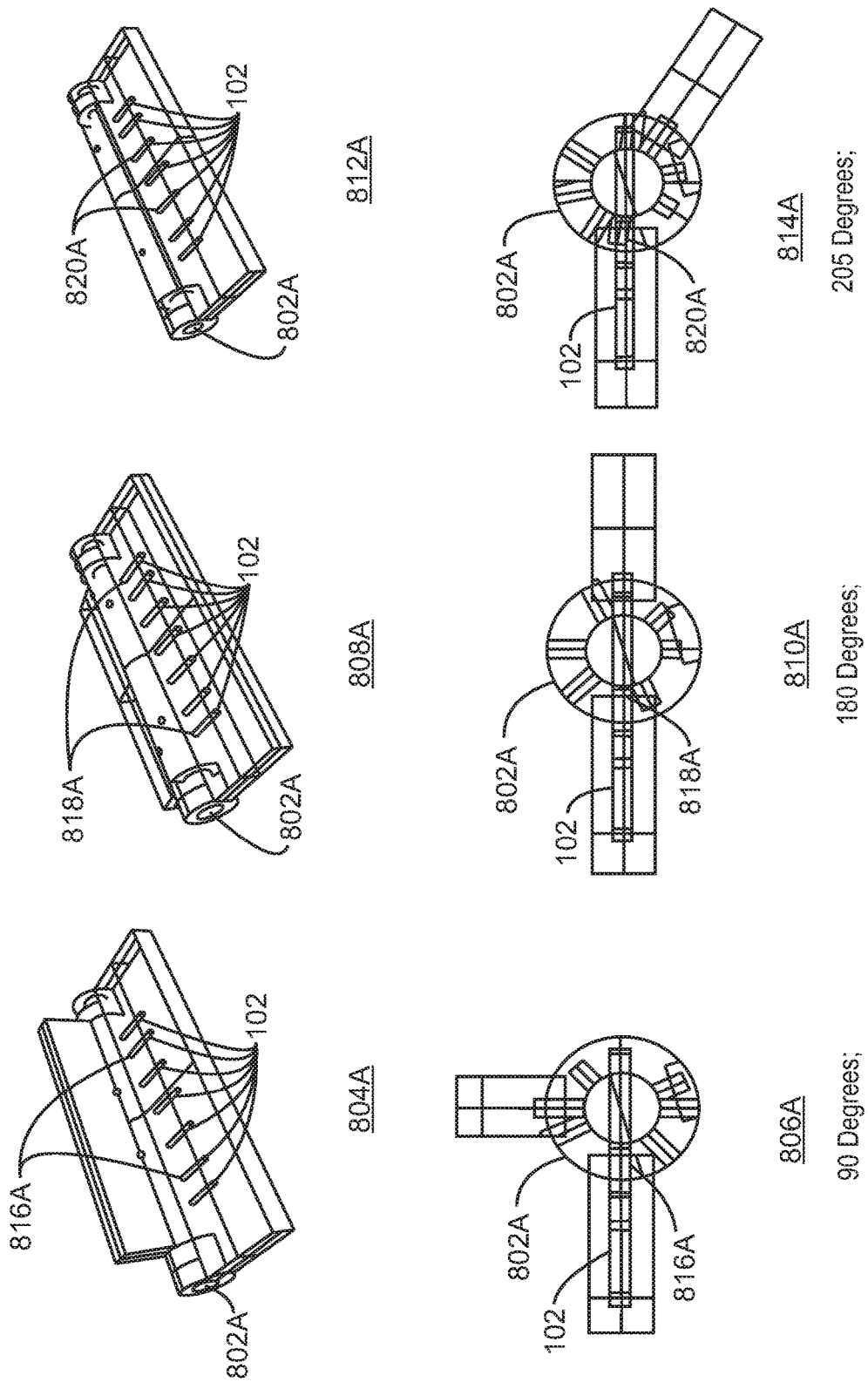

800C

900

ADJUSTMENT OF MAGNETIC FORCE IN A COMPUTING DEVICE

CROSS REFERENECE TO RELATED APPLICATIONS

Pursuant to 35 U.S.C. § 371, this application is the United States National Stage Application of International Patent Application No. PCT/US2014/032287, filed on Mar. 29, 2014, which claims priority to U.S. Utility patent application Ser. No. 14/229,828, filed Mar. 28, 2014, titled "ADJUSTMENT OF MAGNETIC FORCE IN A COMPUTING DEVICE".

TECHNICAL FIELD

This disclosure relates generally to magnetic tension components and a magnetic force adjustment mechanism. More specifically, the disclosure describes magnetic components of a computing device that are held together by a magnetic force that may be adjusted by a mechanical force mechanism or electromagnetic mechanism that alters the force between the two magnetic components and thereby the force required to move or fully separate the two magnetic components relative to each other.

BACKGROUND

Computing devices include components configured to move, such as a hinge. Many laptop hinges rely on friction in the hinge to hold the components in place at a certain angle. For example, a user may manually adjust the angle of a laptop screen relative to its keyboard by manually overcoming the force of friction to rotate the screen about a hinge. In addition, magnets may be used to hold two components of a computing device together. For example, a tablet may be connected to a keyboard via a magnetic connection. A user must exert enough force to overcome the magnetic force to remove the tablet from the keyboard.

In addition, computing devices include components such as latching mechanisms to close components, such as a lid closing to a base. Some laptop computers include a mechanism to keep the lid and base in contact when the lid is in a closed position. For example, a lid of laptop may be closed to the base of the laptop by a button and hook arrangement wherein a hook is arranged in either the lid or the base to fasten the lid to the laptop in a closed position, and wherein the button is arranged in either the lid or the base to enable a user to release the hook and open the laptop. As another example, some laptops may include magnets in the lid, the base, or both, wherein a magnetic force holds the lid closed to the base. A user must exert a force to overcome the magnetic force between the lid and the base to open the laptop.

BRIEF DESCRIPTION OF DRAWINGS

FIG. 6A is set of front perspective views of cross sections of example magnetic attachment mechanisms using a mechanical mechanism to manipulate the attractive forces of magnetic elements;

FIG. 6B is a front perspective view of a cross section of an example magnetic attachment mechanisms using a knob to manipulate the attractive forces of magnetic elements;

FIG. 7B is a set of front perspective views of cross sections of an example magnetic attachment mechanism using a rack and pinion to prevent misalignment;

FIG. 8A is an example frictionless barrel hinge at 90, 180 and 205 degree positions;

The same numbers are used throughout the disclosure and the figures to reference like components and features. Numbers in the 100 series refer to features originally found in FIG. 1; numbers in the 200 series refer to features originally found in FIG. 2; and so on.

DETAILED DESCRIPTION

Figure 1:
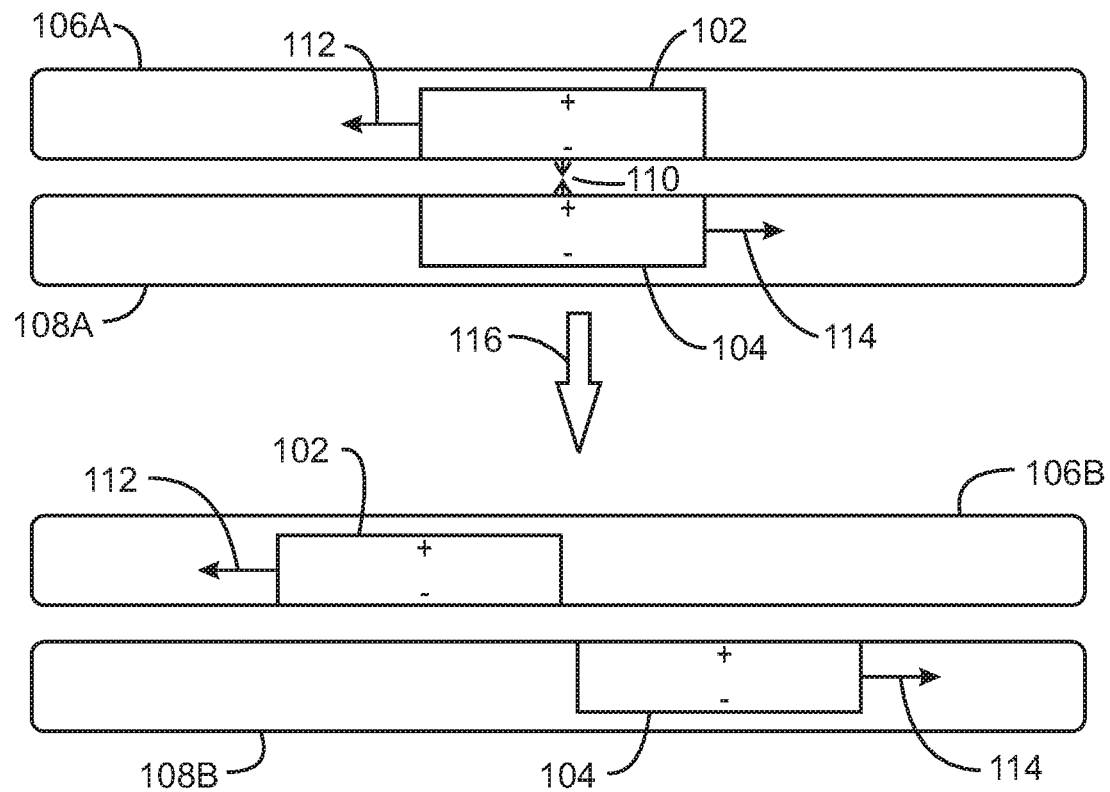
FIG. 1 is a block diagram illustrating magnetic elements of a computing device that are physically separated by a shearing motion.

The subject matter disclosed herein relates to techniques for forming a magnetic tension mechanism having an adjustment mechanism to aid in the separation or attachment of magnetic components. Computing devices may employ latches, hooks, and magnets to secure movable components of the computing device, such as a lid of a laptop or the keyboard/cover of a tablet. For example, a laptop may include a magnetic component in a lid of a laptop configured to be magnetically coupled to a magnetic component in a base of the laptop. A separation mechanism may alter or reconfigure the magnetic components such that the magnetic components physically separate from one another. Rather than requiring a user to pry computing components apart, such as a lid from a base, against a magnetic force associated with the magnetic components in the lid and the base, the techniques described herein include the introduction of forces or components to move the magnetic components laterally to physically separate the magnets and reduce the magnetic force exerted between the magnetic components.

Computing devices may also employ friction hinges to allow rotatable components of the computing device to be held in place, such as the display of a laptop. An adjustment mechanism may also be used to adjust the magnetic force between two or more magnetic elements within the movable or rotatable computer components. A mechanical adjustment mechanism may apply a force at magnetic elements of a computing device to ease the release of computing device components that are fastenable by the magnetic elements. A mechanical adjustment mechanism may apply a rotational force at the magnetic elements to reduce or reverse the magnetic force. Additionally, a mechanical adjustment mechanism can apply a force at the magnetic elements in parallel to the magnetic force to aid in the separation of the two magnetic elements. In some aspects, an electromagnetic adjustment mechanism may create a magnetic field that reduces or reverses the force between the two magnetic elements.

In addition, the introduction of convertible computing devices has introduced a range of mechanical engineering questions about the optimal attachment and detachment mechanisms and associated forces. A convertible computing device includes two or more pieces that can be joined or separated by a user. A wide variety of designs current exist on the market. For example, tablet attachments to a keyboard, and tablet cover attachments exist that have designs that are mechanically fixed. The attachment and detachment mechanisms and forces do not change and are not changeable. However, studies have shown that users possess different preferences on the attachment and detachment forces and that the ease of attachment and detachment play a big role in the user's perception of and experience with a detachable device. The embodiments described herein allow users to configure the attachment and detachment forces in a variety of ways to meet specific user preferences. In some examples, the adjustment mechanisms may be automatically controlled by logic within the computing device.

Furthermore, laptops, two-in-one detachable laptops, and convertibles typically use hinges that combine friction-based torque to provide the user the ability to adjust and set angles of a display screen. However, these friction-based hinges have pain points and limitations in terms of: progressive wear, inefficiencies in size, lack of customizability—as the torque variability is set and unadjustable, and not allowing proper contact for communication of wireless technologies due to radio alignment and lens alignment. Embodiments herein also provide for a compact, robust, frictionless hinge that uses magnetic attraction in a rotational axis to allow rotation and setting of intervals to adjust the angle of the screen on devices including, but not limited to, a laptop, detachable and/or a base, using a compact and robust, yet simple solution to achieve screen adjustment.

Finally, detachable hinge mechanisms require protruding features for secure attachment of the lid and base that often impact the industrial design of the product. The use of magnets allows for a lid and base to be connected with less impact to industrial design. Magnetic components also can help overcome the required connector mating forces. However, there are a couple issues with using magnetic components for a detachable. One issue is that the force required for a solid connection between the lid and the base makes it hard for a user to detach the two components. In current magnetic detachable products, two hands and a ripping action are needed to detach a component. Current magnetic solutions also do not allow for 120° screen articulation. In user preference studies, 120° is within the range of user preference for viewing laptop displays. Also, when the force of the magnetic connection to allow for screen articulation is increased, then the magnetic force required may be too large for a person to overcome and can be unsafe. Embodiments herein allow for variable magnetic states required for both functional operation and user safety.

A "magnetic component" as referred to herein, may include an object made from a material that is ferromagnetic or ferrimagnetic. In some embodiments, the magnetic component is a magnet wherein the magnetic component is magnetized and may exert a substantially persistent magnetic field. In other embodiments, one of the magnetic components may be a ferromagnetic component, or a ferrimagnetic component, but not a magnet, such as a steel bar that is not magnetized, while the other magnetic component is a magnet configured to attract the ferromagnetic component, or a ferrimagnetic component, as discussed in more detail below.

FIG. 1 is a block diagram illustrating magnetic elements of a computing device that are physically separated by a shearing motion. A computing device may include a first magnetic element 102 is and a second magnetic element 104. FIG. 1 includes two component pairs, each having a first magnetic element 102 and a second magnetic element 104. A first pair includes component 106A and component 108A, a second pair includes component 106B and component 108B. A transition between the first pair and the second pair is denoted by arrow 116. As illustrated in FIG. 1, the first magnetic element 102 may be integrated with a first component 106A, 106B of the computing device, and the second magnetic element 104 may be integrated with a second component 108A, 106B of the computing device. In some cases, the first component 106A, 106B may be a lid of a laptop computer, and the second component 108A, 108B may be the base of the laptop computer. In other cases, the first component 106A, 106B may be a tablet computer, and the second component 108A, 108B may be a keyboard, cover, or stand.

A magnetic force may exist between the first and second magnetic elements 102, 104 when the first 106A and second 108B computing device components are in close proximity, as indicated by the arrows 110. One or both of the magnetic elements 102 and 104 may be physically displaced by a displacement indicated by the arrows 112 and 114. As illustrated in FIG. 1, the displacement 112, 114 may be created by a lateral force applied at either the first magnetic element 102, the second magnetic element 104, or at both the first and second magnetic elements 102, 104. The displacement 112, 114 is perpendicular to the magnetic force 110 and may be less than the magnetic force 110. Therefore, a user may be able to overcome the magnetic force without applying a force equal and opposite to the magnetic force 110.

As indicated by the arrow 116, when either the first magnetic element 102, the second magnetic element 104, or both the first and second magnetic elements 102, 104 are laterally moved due to the displacements (either 112, 114, or both 112 and 114), the magnetic force 110 is reduced or eliminated. Once the magnetic force 110 is reduced or eliminated, the first component 106B may move relative to the second component 108B, such as if the first component 106B is a lid and the second component 108B is a base of a computing device. In some examples, first component 106B may be a component to be detached from a base component 108B of a computing device.

The displacement mechanism may be, in one embodiment, a slider to manipulate the magnetic element along a defined track. In some embodiments, both of the magnetic elements are magnets. However, in other embodiments, one of the magnetic elements is a magnet, while the other magnetic element is a ferrimagnetic material, or a ferromagnetic material, such as steel, but is not a magnet. In yet another embodiment, both of the magnetic elements 102, 104 are magnets and one or more of the magnetic elements 102, 104 may include a metal backplate. In some embodiments, the metal backplate may increase the magnetic force between the magnetic components relative to other embodiments.

Using a displacement mechanism may lower the energy required to separate the two magnetic elements 102, 104. By using lateral force actions to separate the magnetic elements first, rather than using a distraction force to directly pull the magnetic apart, less force is required to separate the magnetic elements. Furthermore, because a lateral displacement may only require moving one of the magnetic elements 102, 104 in a perpendicular motion, space may be saved by not having to move either of the magnetic elements in a motion parallel to the magnetic force inside the components. Additionally, a reconfiguration of the polarity of one or more of the magnetic elements, achieved either through electrical or physical manipulation of the mechanism, can shift the attractive force to a repulsive force. Such a repelling force may be produced through rotation of one of the magnetic elements 102, 104 relative to other as in FIG. 2.

Figure 2:
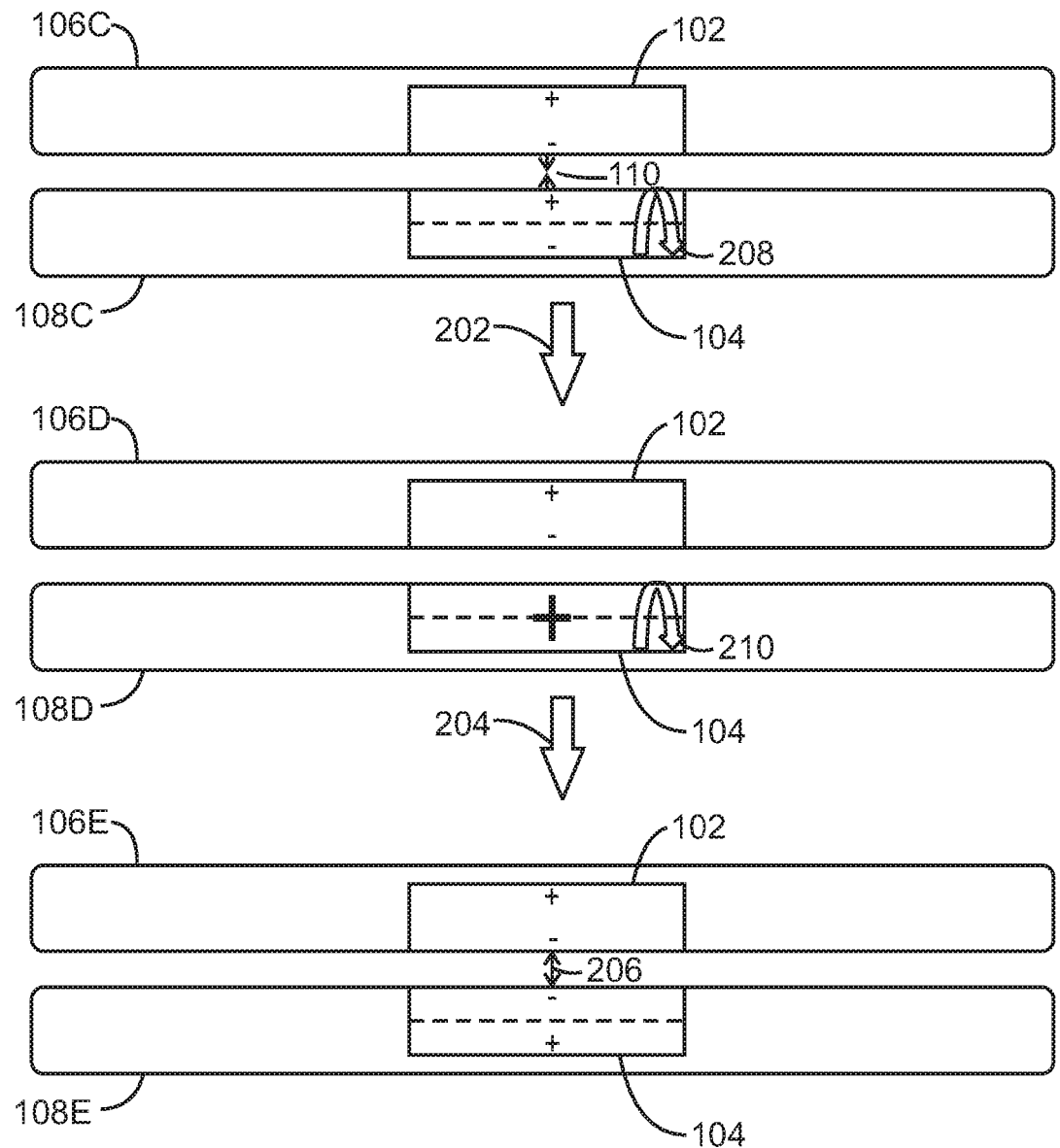
FIG. 2 is a block diagram illustrating the magnetic force between two magnetic elements of a computing device that is reduced and/or reversed by manipulation of the magnetic polarities.

FIG. 2 is a block diagram illustrating the magnetic force between two magnetic elements of a computing device that is reduced and/or reversed by manipulation of the magnetic polarities. FIG. 2 includes three pairs of components. A first pair includes component 106C and component 108C, a second pair includes component 106D and component 108D, and a third pair includes component 106E and component 108E. A transition between the first pair and the second pair is denoted by an arrow 202, and a transition between the second pair and the third pair is denoted by arrow 204. Again, a computing element may include a first magnetic element 102 integrated with a first component 106C, 106D, 106E, and a second magnetic element 104 may be integrated with a second component 108C, 108D, 108E of the computing device. A magnetic force 110, 206 may exist between magnetic element 102 and magnetic element 104.

As illustrated in FIG. 2, one of the integrated magnetic elements 104 may be rotated about a central axis as indicated by a dashed line with an arrow 208, 210. In the example of FIG. 2, second magnetic element 104 has been rotated by 90 degrees about its central axis so that north (indicated by the "plus" sign) is facing out of the illustration in component 108D. By rotating magnetic element 104 by 90 degrees, the force between the first magnetic element 102 and the second magnetic element 104 will be reduced or eliminated between components 106D and 108D. Therefore, a user will be able to more easily move computing device component 106D apart from computing device component 108D. In some examples, the total angle of rotation may be adjustable by the user. In some examples, the total angle of rotation may automatically adjusted by an electronic mechanism. For example, the electronic mechanism may be a motor that is to move a mechanical component. In some examples, a rod may be connected to the magnetic element to be rotated to reduce or reverse the magnetic force 110 by rotational displacement of the magnetic element 104. In some examples, the rod may be attached to a knob for manual rotation. In some examples, the rod may be attached to an electric motor. For example, the electric motor may be used for automated rotation of the rod.

The second magnetic element 104 may be turned another 90 degrees as indicated by arrow 210 of FIG. 2 to result in the orientation of second magnetic element 104 in 108E. When second magnetic element 104 is thus turned a total of 180 degrees from its original position in 108C, the polarity of the second magnetic element 104 is reversed from its orientation in 108C. Therefore, the original attractive force 110 between magnetic element 102 and magnetic element 104 is also reversed and results in a repelling magnetic force as indicated by magnetic force 206. The repelling force 206 can assist a user in separating computing device components 106E and 108E apart from each other. For example, repelling force 206 may allow a person to separate component 106E from component 108E using only one hand.

Using a rotational force on a magnetic element 102,104 therefore may result in the production of a repelling force 206 to aid a user in separating the computing components 106, 108. However, in some instances, a design may want to minimize magnetic movement, perhaps to provide for a stable magnetic field. In this case, the distractive force of FIG. 3 may minimize magnetic movement.

Figure 3:
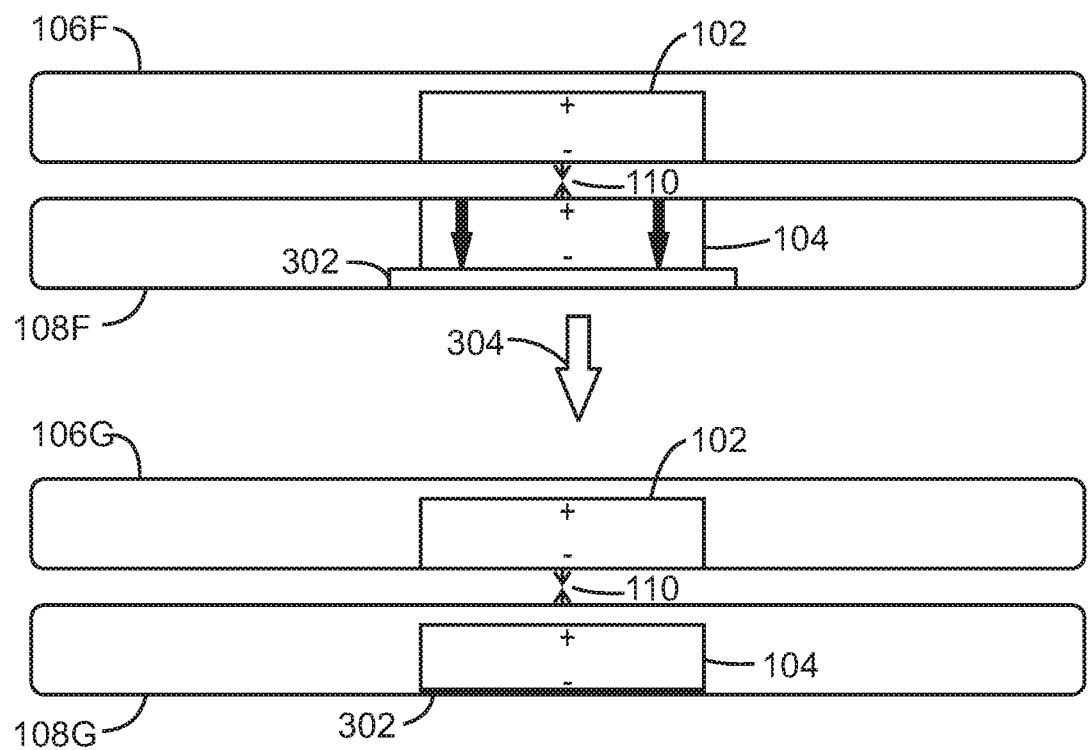
FIG. 3 is a block diagram illustrating magnetic elements of a computing device that are physically distracted to alter the attraction force between two magnetic components.

FIG. 3 is a block diagram illustrating magnetic elements of a computing device that are physically distracted to alter the attraction force between two magnetic components. FIG. 3 includes two pairs of components. A first pair includes component 106F and component 108F and a second pair includes component 106G and component 108G. Components 108F and 108G include mechanical component 302. In some examples, the mechanical component 302 may be a memory shape alloy actuator capable of producing enough force to pull magnetic element 104 from force 110. In some examples, mechanical component may include small motors, piezoelectric motors, gears, levers or cams. A transition between the first pair and second pair of components is indicated by arrow 304.

In the example of FIG. 3, a mechanical component 302 may be used to pull magnetic element 104 away from the direction of the magnetic force. As shown by arrow 304, the force 110 resulting from the displaced magnetic element 104 may be reduced. In some examples, the magnetic element 104 may be distracted by such distance that a user may easily pull apart computing device component 106 away from computing device component 108. In some examples, the displacement distance may be configurable or automatically adjustable.

One benefit of using distraction to initially pull magnetic elements 102, 104 apart is the minimal or absent lateral movement involved in such a design. Unlike the lateral displacement mechanism of FIG. 1, a parallel force mechanism would not require any lateral movement. However, this parallel force mechanism is not by itself capable of producing a repelling force as in FIG. 2 or FIG. 4 below.

Figure 4A:
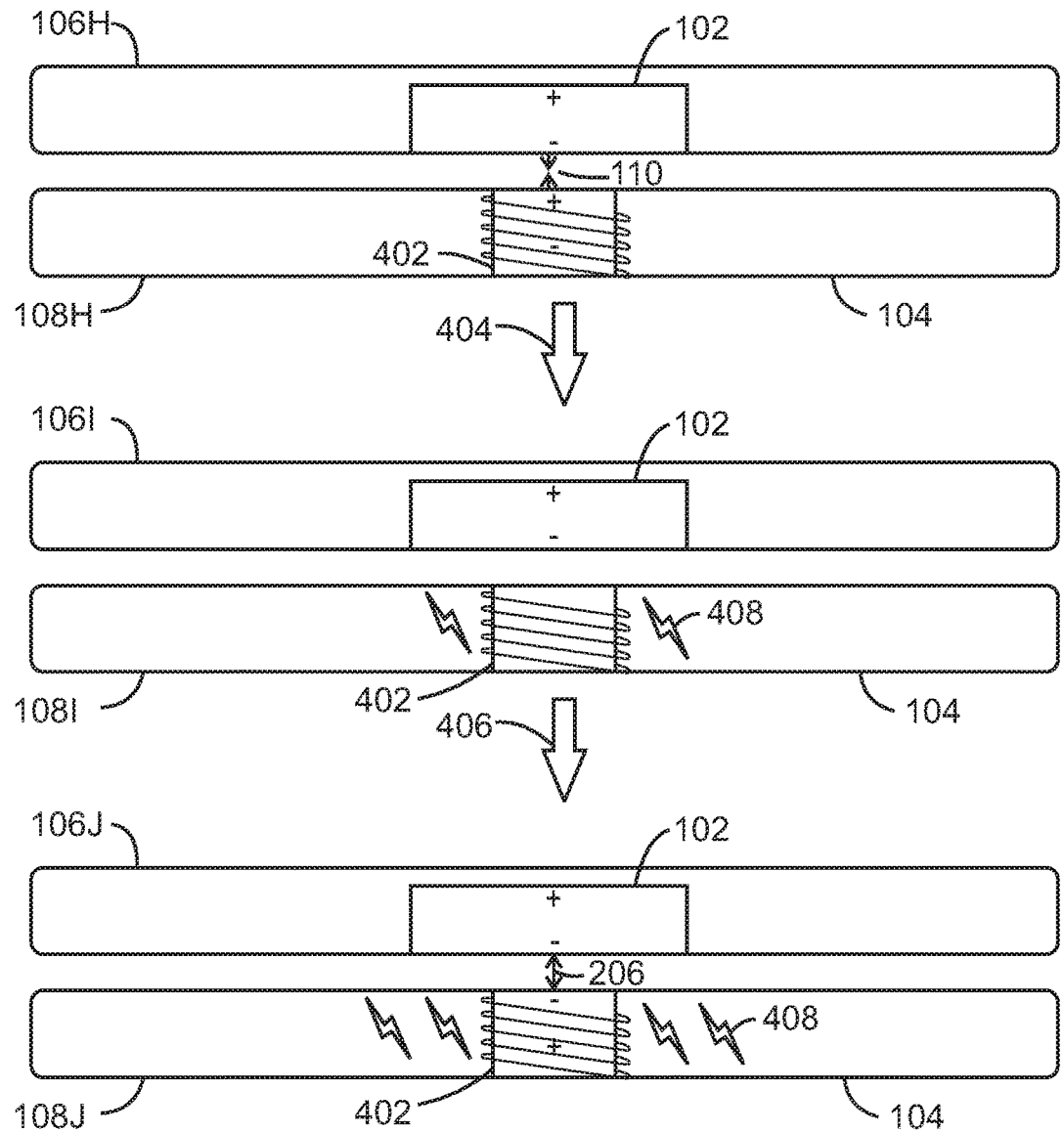
FIG. 4A is a block diagram illustrating magnetic elements of a computing device to be separated by an electromagnetic force.

FIG. 4A is a block diagram illustrating magnetic elements of a computing device to be separated by an electromagnetic force. The particular configuration of electromagnetic attachment in FIG. 4A may be referred to generally by the reference number 400A. FIG. 4A includes three pairs of components. A first pair includes component 106H and component 108H, a second pair includes component 106I and 108I, and a third pair includes component 106J and 108J. Components 108H, 108I, and 108J each have an electromagnet 402. A transition between the first and the second pair is indicated by arrow 404, and a transition between the second and third pair is indicated by arrow 406. The presence and relative amount of current in electromagnet 402 is indicated by lightning bolts 408. In some examples, an electromagnet 402 may be used to temporarily adjust magnetic force between computing device component 106I, 106J and computing device component 108I, 108J. The electromagnet 402 may be composed of magnetic material such that the magnetic element 102 creates a north pole at the side of electromagnet 402 closest to the south pole of magnetic element 102. The core of electromagnet 402 may be made of a magnetic material with a high permeability, such as a ferromagnetic metal as iron, or a ferrimagnetic compound such as ferrites. The opposite poles in close proximity results in attractive magnetic force 110. In some examples, electromagnet 402 of component 108H may be an electropermanent magnet that includes a permanent magnet surrounded by a coil of conducting wire. The permanent magnet 402 of 108H may be arranged to have an opposite pole face the closest pole of magnetic element. For example, applying current to the electromagnetic coil may be used to temporarily disable the attractive force of the permanent magnet by altering its magnetic field. With even more current applied, the electromagnetic coil may be used to repel the magnetic element 102 from electromagnet 402. In some examples, the electromagnet 402 may be an electropermanent magnet capable of switching its poles. For example, the electropermanent magnet may include both an electromagnet and a dual material permanent magnet in which the magnetic field produced by the electromagnet is used to change the magnetization of the permanent magnet. In this case, the magnetization of the permanent magnet can be switched by the electromagnet 402 and would remain in the new state of polarity without a continued supply of current.

In the example of FIG. 4A, an electromagnet 402 may begin in an "off" state without any power or current flow as indicated by the absence of any lightning bolts. As shown by lightning bolt 408, a small current may be applied to electromagnet 402 in component 108I, creating a magnetic field around electromagnet 402. An electrical current may be applied to the wire to produce a magnetic field that offsets the effects of the magnetic field generated by magnetic element 102. The interaction of the two magnetic fields may result in minimal to no force between electromagnet 402 and magnetic element 102. A user may then pull apart component 106I from computing device component 108I with ease.

As shown by arrow 406, in some examples, a relatively larger current may be applied to the electromagnet 402 of component 108J to produce a strong magnetic field and a resulting repelling force 206. The repelling force may help a user to pull computing device component 106 away from computing device component 108. In some examples, the electromagnet may cause the polarity of a dual material permanent magnet to switch and the switch in polarity may also result in a repelling force 206 at component 108J. In some examples, the repelling force 206 may push components 106J and 108J apart a distance to allow a user to easily continue to separate the two components 106J and 108J manually. For example, the repelling magnetic force of electromagnetic 402 may produce a large repelling force than the total magnetic force holding 106J and 108J together. User may then finish separating component 106J from component 108J manually.

Figure 4B:
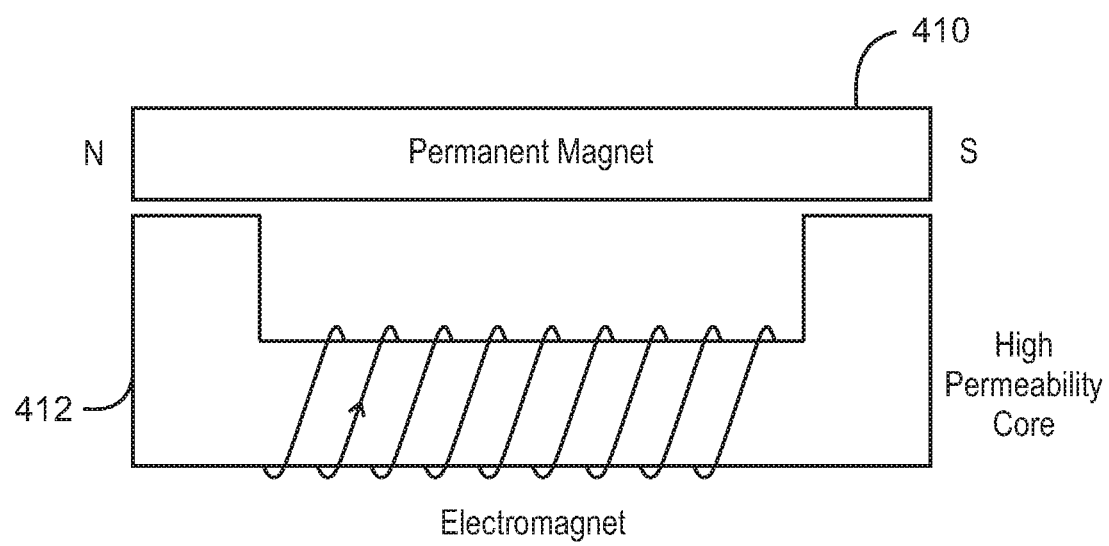
FIG. 4B is a block diagram illustrating an example of magnetic elements of a computing device to be separated by an electromagnetic force.

FIG. 4B is a block diagram illustrating an example of magnetic elements of a computing device to be separated by an electromagnetic force. The particular configuration of electromagnetic attachment in FIG. 4B may be referred to generally by the reference number 400B. As illustrated in FIG. 4B, permanent magnet 410 may be oriented horizontally so that one magnetic pole faces left and the other magnetic pole faces right. An electromagnetic element 412 may be formed in a "U" shape and magnetically attached to both ends of the bottom side of permanent magnet 410.

As in example magnetic attachment mechanism 400A, the force between permanent magnet 410 and electromagnet 412 in electromagnetic attachment mechanism 400B may be reduced or even reversed depending on how much current is supplied to electromagnet 412. By using a horseshoe or "U" shape design, the resulting magnetic force may be directed solely at the permanent magnet 410. Electromagnetic interference (EMI) may also be minimized using this design, as the magnetic permeability of air is lower than the permeability of the electromagnetic core.

One benefit of the electromagnet mechanism 400A, 400B is reduced space with no internal movement required for the magnetic element 102, 410 or electromagnet 402, 412. However, the adjustment mechanisms of the preceding examples may be used either separately or in any combination to adjust the magnetic force between one component 106 of a computing device and a second component 108 of a computing device. Although a single mechanism may be mentioned in the following example embodiments, one or more of the adjustment mechanisms discussed at length above may be used in addition to or instead of the described mechanisms.

Figure 5A:
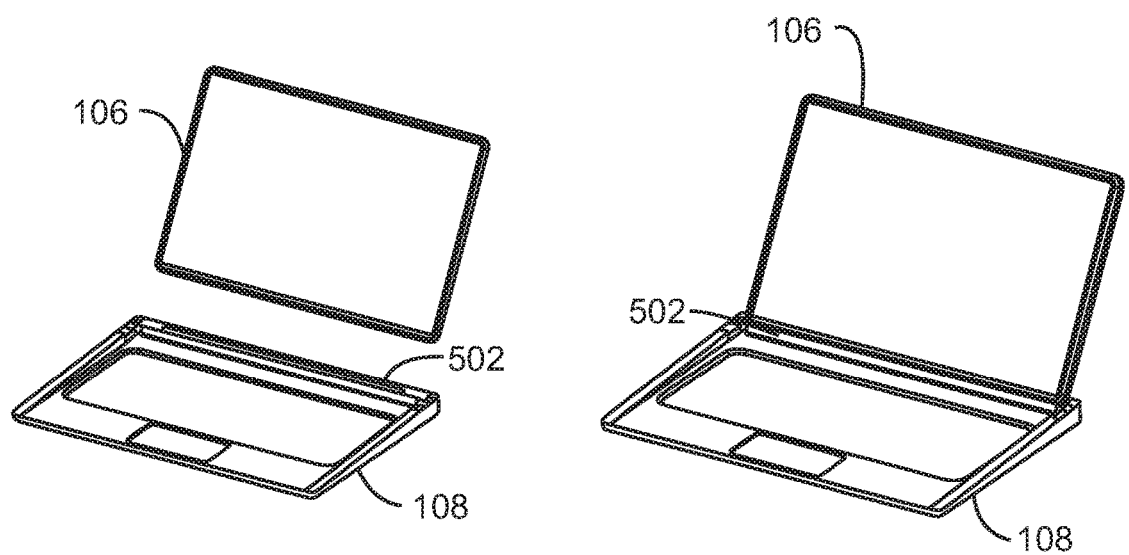
FIG. 5A is an example computing device with a tablet component and a keyboard component having an attachment surface onto which the tablet component may attach or detach.

FIG. 5A is an example computing device with a tablet component 106 and a keyboard component 108 having an attachment surface 502 onto which the tablet component 106 may attach or detach. In some examples, attachment surface 502 may be a dock cradle for a keyboard component 108 of a portable tablet 106. In some examples, the keyboard component 108 may be a cover 108 that is attached to tablet 106 via magnetic force. The attachment surface 502 may contain one or more magnetic elements to attach to one or more magnetic elements within tablet 106. In some examples, tablet 106 or keyboard component 108 may contain gyros, accelerometers, or proximity sensors to determine orientation and acceleration of the computing device or actions of the user.

Figure 5B:
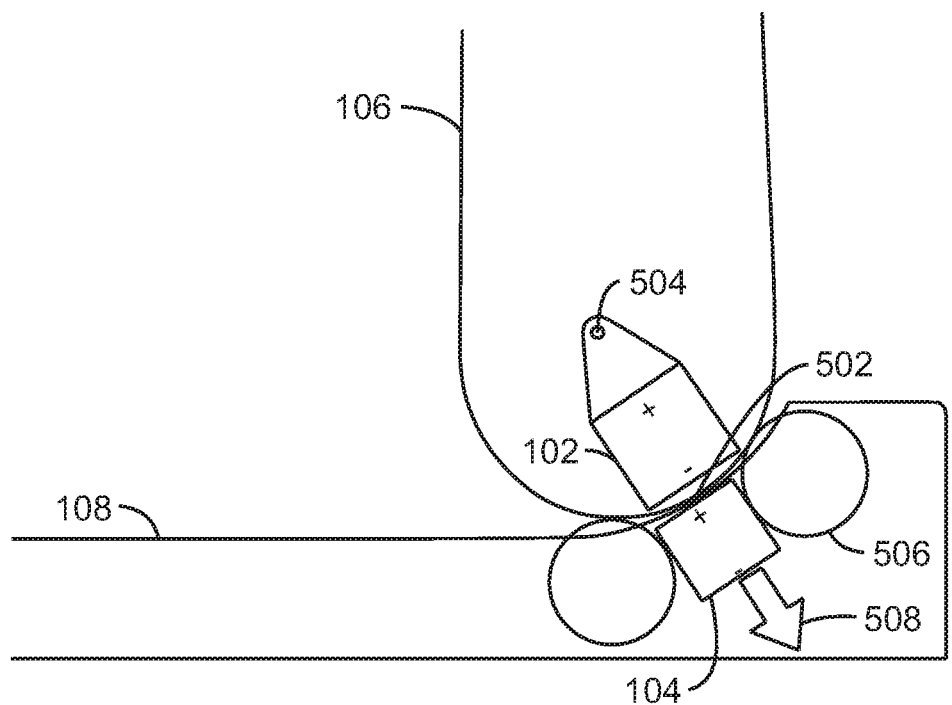
FIG. 5B is a side perspective cross-section view of an example computing device with a tablet component magnetically attached to an attachment surface of a keyboard component.

FIG. 5B is a side perspective cross-section view of an example computing device with a tablet component 106 magnetically attached to an attachment surface 502 of a keyboard component 108. The tablet component 106 may have an axis 504 about which magnetic element 102 may freely rotate about. In embodiments, axis 504 may be connected to an electromechanical actuator (not shown). In some examples, the electromechanical actuator may be a shape memory alloy actuator, a motor, a servo, a solenoid or a peizo motor. The keyboard component 108 may have two rollers 506 on which the end of tablet 106 may rotate.

As shown in FIG. 5B, the magnetic element 102 of tablet 106 may be magnetically attached to magnetic element 104 of keyboard 108 at attachment surface 502. As shown by arrow 508, the magnetic force between magnetic elements 102, 104 may be reduced by moving magnetic element 104 away from magnetic element 102 in a direction parallel and opposite to the magnetic force. For example, a linear actuator may forcefully separate magnetic element 104 away from magnetic element 102. By reducing the force between magnetic element 102 and magnetic element 104 using a linear actuator, a user may more easily detach component 106 from component 108.

In embodiments, the magnetic detachable hinge connection may exist in different states depending on magnetic load required for a particular state. For example, a first state for tablet attachment may require a strong but safe magnetic force, such as 5 lb-F. For example, a second state for resisting torque from screen adjustment and connector may be a high force such as 25 lb-F. A third state, for example, may be a detachment force that is easy to overcome such as 2 lb-F. The different magnetic states may be achieved through any of the mechanical or electromagnetic mechanisms discussed in detail in FIGS. 1-4. In some examples, the attachment and detachment forces may be preset based on load requirements. For example, the load requirement may be the weight of an attached tablet 106.

In some embodiments, the linear actuator may be controlled via logic of the computing device. In some examples, the logic may be at least partially be composed of hardware logic. For example, the logic for controlling the linear actuator may be integrated into the power management logic of tablet 106. Although a linear actuator is used as an example, any adjustment mechanism, whether electromechanical or electromagnetic, may be used and controlled by logic of the computing device.

In some embodiments, the linear actuator may be controlled via a graphical user interface (GUI). For example, a GUI switch may be used for convenient switching of the magnetic forces between an attachment force and a weaker detachment force. The GUI switch may send logic signals to the hinge so that it can exist in a detachment force state when the user wants to detach a component. The GUI switch may allow a user to quickly lower the magnetic force to a detachment force and separate the tablet 106 from keyboard base 108 with one hand. Likewise, the GUI switch may allow a user to quickly switch the magnetic force to an attachment force to reconnect the tablet 106 to the keyboard base 108. In some examples, the attachment force may automatically return to an attachment state once the user has fully removed the tablet 106 from the keyboard base 108. In some examples, the attachment force may be raised from or lowered to a weaker detachment force by aligning or misaligning magnets in an array as discussed further in FIG. 6.

FIG. 6A is set of front perspective views of cross sections of example magnetic attachment mechanisms using a mechanical mechanism to manipulate the attractive forces of magnetic elements. FIG. 6A includes two pairs of components. The first pair includes component 106K, component 108K, linear actuator 602A and attachment surface 502A. Component 106K is connected magnetically to component 108K via magnetic elements 104A of attachment surface 502A of component 108K. The second pair includes component 106L, component 108L, linear actuator 602B, and attachment surface 502B. Component 106L is connected to component 108L via magnetic elements 104A within attachment surface 502B of component 108L. The first pair and second pair include each include magnetic elements 102 and 104A. In some examples, the mechanical mechanism used to move magnetic elements 104A, 104B may be one or more linear actuators 602 or one or more manually adjustable knobs 604. The example using a linear actuator 602A, 602B is referred to generally by the reference number 600A. A linear actuator 602A, 602B may include a motor and a mechanical component to convert rotations of the motor into linear motion. For example, the mechanical component may be a screw and nut, rack and pinion, or a cam. A transition between the first pair of components and the second pair of components in example 600A is denoted by arrow 606. In addition, in order to control certain magnetic attraction or repulsion characteristics when detaching or attaching the computer components, the system would be expected to benefit from embodiments that generate symmetric and opposing translations of the magnetic components. For example, a gearing or linkage system may be used in place of or in combination with the linear actuators 602A, 602B to move half of the magnets one direction and the rest of the magnetic components in the opposite direction. This configuration would balance the attraction forces of the misaligned magnets to help keep the computer components aligned for ease of attachment or detachment.

As shown in FIG. 6A, attachment surface 502A may contain several magnetic elements 104A that are magnetically coupled with corresponding magnetic elements 102 of tablet 106K. In some examples, magnetic elements 104A may be fixed in a carriage that can be rotated or translated in a manner that alters the magnetic field along an attachment surface 502A, 502B, 502C. In some examples, the attachment surface 502A, 502B may contain a linear actuator 602 that may laterally translate the magnetic elements 104A, 104C. For example, in FIG. 6A, magnetic elements 104A, 104C are translated in the direction of arrow 608. Translating the magnetic elements 104A may result in a reduced magnetic force between the magnetic elements 102, 104A as discussed above in FIG. 1. As illustrated in FIG. 6A, extra magnetic elements 104C may be included in the hinge to maintain a minimal amount of magnetic force between tablet 106K, 106L and keyboard 108K, 108L. In some examples, the multiple magnetic elements 104A may be individually or collectively altered relative to their neighbors to create unique magnetic field profiles along the attachment surface of attachment surface 502B. The reduced magnetic force between magnetic elements 102 and fewer magnetic elements 104C may allow a user to easily remove the tablet from the attachment surface 502B of computing device component 108L. In some examples, the linear actuator 602B may be controlled based on user input to allow for a configurable setting. For example, a user may adjust the detachment force to make it easier to remove tablet 106 from attachment surface 502. In some examples, the linear actuator 602B may be controlled using sensors to increase attraction force for ease in alignment while attaching. For example, proximity sensors may be used to detect a user is about attach tablet 106. The linear actuator 602B may then increase the magnetic force between magnetic elements 102, 104A to allow the two components 106K, 108K to attractively join together. In some examples, the linear actuator 602A may be controlled by the orientation of the tablet 106K. For example, a horizontal orientation of the tablet 106K may indicate attachment and the linear actuator would position the magnetic elements 104A to create a maximum attraction force between magnetic elements 102 and 104A. Placing the tablet on its edge may indicate detachment and the linear actuator may therefore position magnetic elements 104A to minimize attraction or create a repulsion force between magnetic elements 104A and 102 to aid in detachment.

Using a linear actuator 602A, 602B allows automated settings for the magnetic forces that can be customized or preconfigured for a variety of conditions. For example, a relatively high attachment force and relatively low detachment force may be configured to improve user experience. However, such a mechanism requires power to operate and some applications might require or prefer to minimize any power use. If power is to be saved, a manually operated mechanical mechanism may be used.

FIG. 6B is a front perspective view of a cross section of an example magnetic attachment mechanisms using a knob 604 to manipulate the attractive forces of magnetic elements. The example using a knob 604 is referred to generally by the reference number 600B. FIG. 6B includes a pair of components that includes component 106M, component 108M, and a knob 604 and attachment surface 502C. Component 106M is connected to component 108M via magnetic elements 104B of attachment surface 502C of component 108M. Component 106M includes magnetic elements 102 and component 108M includes magnetic elements 104B.

In the example of 600B, a knob 604 may be connected to a rod having an outer thread that is connected to an inner thread of a component attached to magnetic elements 104B. A knob 604 is a mechanical component capable of being turned or rotated manually. For example, a user may manually rotate the knob 604 and translate magnetic elements 104B to the left or to the right depending on the direction of rotation.

In some embodiments, a user may rotate knob 604 of attachment surface 502C to turn a mechanical screw component that causes the magnetic elements 104B to translate. The user may fine tune the force between magnetic elements 102, 104B by rotating the knob 604. For example, the user may lower the magnetic attachment force by rotating the knob 604 in one direction and then proceed to remove tablet 106M from the attachment surface 502C of keyboard 108M with minimal force. In some examples, the user may increase the magnetic attachment force by rotating the knob 604 in the other direction. For example, a user may want to increase the magnetic force manually before storing the computing device in a backpack.

The distributed magnetic elements and the ability to translate and/or rotate the magnetic elements of an attachment mechanism introduce the capability to create unique attachment and/or detachment actions that benefit from the physics of magnetic attraction. In some examples, some users may develop specific combinations of magnetic component translations, distractions, and rotations that suit specific force-displacement characteristics or preferred attachment or detachment actions. For example, a user may separate the two magnetic elements with only one hand.

Figure 7A:
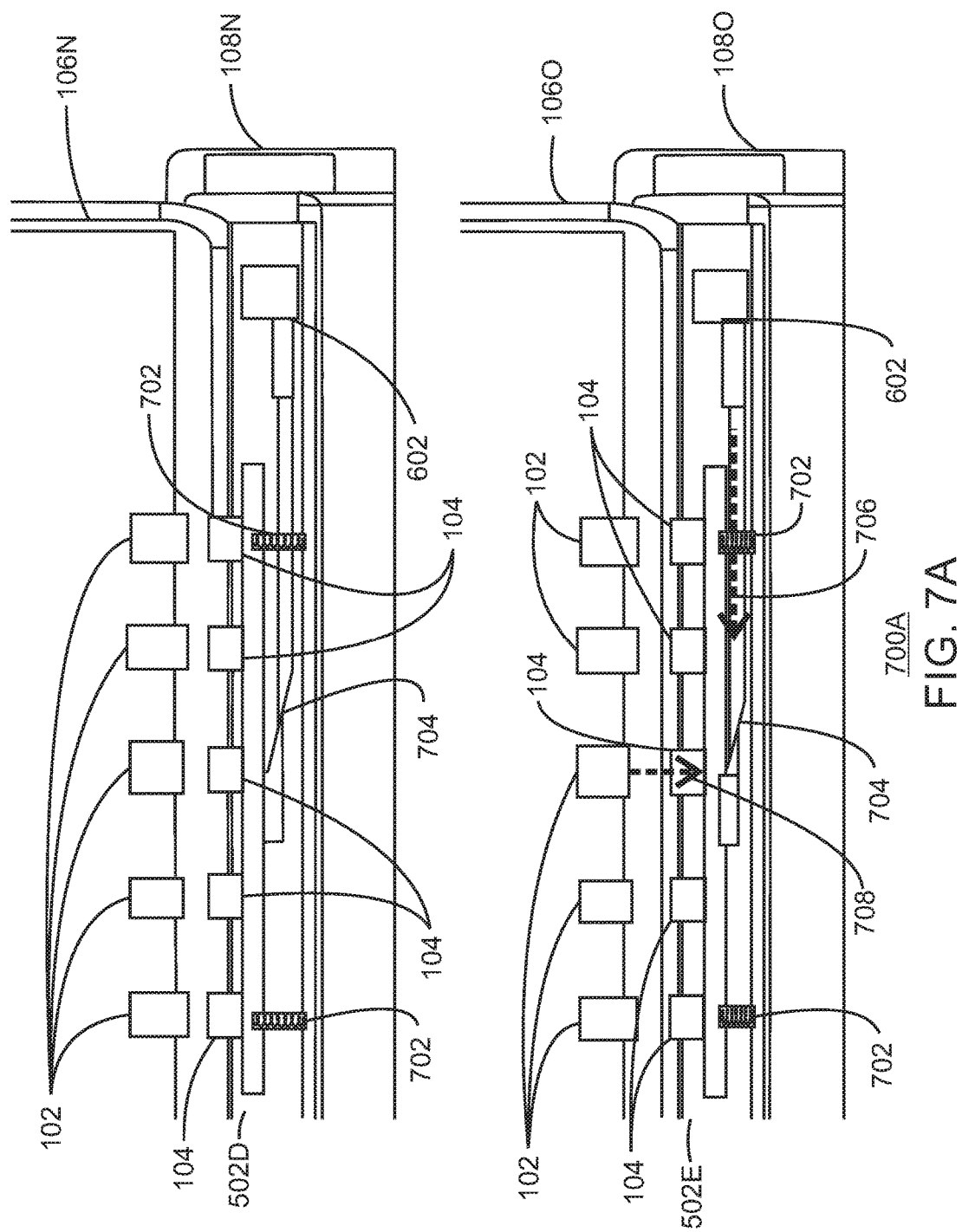
FIG. 7A is a set of front perspective views of cross sections of an example magnetic attachment mechanism using a linear actuator and a chamfered edge mechanism to separate magnetic elements.

FIG. 7A is a set of front perspective views of cross sections of an example magnetic attachment mechanism using a linear actuator 602 and a chamfered edge mechanism to separate magnetic elements 102 and 104. FIG. 7A includes two pairs of components. The first pair includes component 106N and component 108N, and the second pair includes component 106O and component 108O. The hinges 502D, 502E of components 108N, 108O also include multiple magnetic elements 104 held together in a spring-loaded carriage 702, linear actuator 602, and a sliding chamfered edge mechanism 704. The chamfered edge mechanism 704 includes two chamfered edges. One chamfered edge is connected to the spring-loaded carriage 702. The other chamfered edge is connected to linear actuator 602. The particular embodiment using linear actuator 602, a spring-loaded carriage 702, and a chamfered edge mechanism 704 is generally referred to by reference number 700A.

In some examples, the linear actuator 602 may cause the one chamfered edge to slide over the other chamfered edge by pushing one edge into the other edge as shown by arrow 706. The interaction of the two edges in the chamfered edge mechanism 704 produces a compressing force on the springs 702 while distracting the magnetic elements 104 away from magnetic elements 102 as shown by arrow 708. In displacing the magnetic elements 104 from the magnetic elements 102, the linear actuator may thus cause a reduction in the magnetic force between magnetic elements 102 and 104. By thus lowering the magnetic force between magnetic elements 102 and 104, the linear actuator 602 may help a user remove tablet 106O from attachment surface 502E. After the tablet is removed, the springs 702 may return the carriage back to its original position as the linear actuator 702 slides the chamfered edges apart from each other.

In some examples, by moving magnetic elements 102 and 104 closer to each other, the linear actuator 602 may help prevent tablet 106N from falling out prematurely. In some examples, the linear actuator 602 may assist the user in docking the tablet 106N onto attachment surface 502D. For example, linear actuator 602 may increase the magnetic force between elements 102, 104 as the computing device detects a pre-attachment condition such as a specific orientation of the device.

FIG. 7B is a set of front perspective views of cross sections of an example magnetic attachment mechanism using racks and pinions 710 to prevent misalignment. FIG. 7B includes two pairs of components. The first pair includes component 106P and component 108P, and the second pair includes component 106Q and component 108Q. Components 106P, 106Q contain magnetic elements 102. Components 108P, 108Q contain magnetic components 104 that are coupled to racks 710 and pinions 712. The particular embodiment using racks 710 and pinions 712 is generally referred to by reference number 700B.

In the example of FIG. 7B, racks 710 and pinions 712 translate magnetic elements 104 in base 108P, 108Q in opposite directions to provide a counteractive force to prevent misalignment of component 106P, 106Q. As pinion gears 712 rotate in the direction of arrows 714, the pinions 712 cause their respective racks 710 to translate in the direction of arrows 716. In some examples, the magnetic elements 104 may be connected to racks 710 and therefore also translated in the direction of arrows 716. In example 700B, the overall position of magnetic elements 104 has does not translate in either direction. Therefore, example components 106P, 106Q do not require a guide (not shown) on components 108P, 108Q to keep components 106P, 106Q in place with respect to components 108P, 108Q.

Figure 7C:
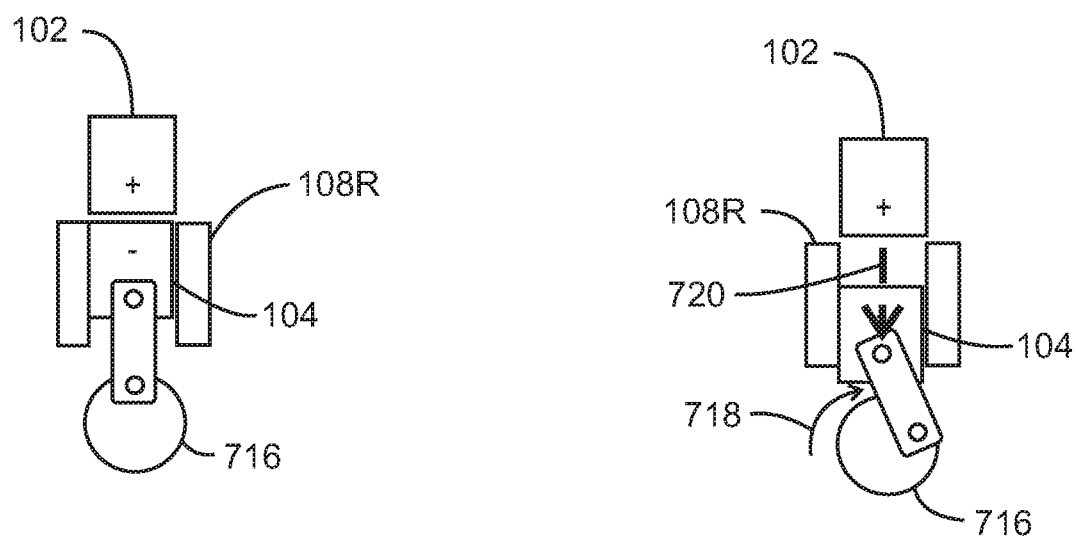
FIG. 7C is a set of side views of cross sections of an example magnetic attachment mechanism using a crank shaft to displace magnetic elements.

FIG. 7C is a set of side views of cross sections of an example magnetic attachment mechanism using a crank shaft 716 to displace magnetic elements. FIG. 7C includes two pairs of magnetic components 102, 104. The magnetic components 104 are mechanically coupled to crank shaft 716. The particular embodiment using In the example of 700C, as the crank shaft 716 rotates creating a piston-style motion to displace the magnets 104 in base 108R. For example, as the crank shaft 716 rotates in the direction of arrow 718, magnetic element 104 may be distracted in the direction of arrow 720. In some embodiments, the mechanism could involve the use of a rotational actuator to rotate a shaft containing cams that effect displacements of magnetic elements 104 through the cam radial eccentricity.

Although the FIGS. 6 and 7A, 7B, and 7C describe adjustment mechanisms using the translations 112,114 in FIG. 1 and distraction actions in FIG. 3, the rotational mechanism of FIG. 2 and the electromagnetic mechanism of FIG. 4 may also be used in addition to or instead of the previously described mechanical mechanisms at attachment surface 502. Additionally, any of the adjustment mechanisms of FIGS. 1-4 may also be used in conjunction with the frictionless rotation systems described below to magnetically attach or detach a first component 106 to a second component 108 or to allow frictionless rotational movement through a series of discrete angles as in FIGS. 8A-8D.

FIG. 8A is an example barrel hinge 802A at 90, 180 and 205 degree positions. FIG. 8A includes six views 804A, 806A, 808A, 810A, 812A, 814A. View 804A is a diagram of the barrel hinge 802A at 90 degrees with internal magnetic elements 102 visible, with a pair of magnetic elements 816A magnetically attached. View 806A is a side perspective close-up of barrel hinge 802A at 90 degrees with internal magnetic elements 816A visible. View 808A is a diagram of the barrel hinge 802A at 180 degrees with attached internal magnetic elements 818A visible. View 810A is a side perspective close-up of barrel hinge 802A at 180 degrees with internal magnetic elements 818A visible. View 812A is a diagram of the barrel hinge 802A at 205 degrees with internal magnetic elements 820A visible. View 814A is a side perspective close-up of barrel hinge 802A at 205 degrees with internal magnetic elements 820A visible. As seen in views 816A, 818A, 820A, barrel hinge 802A contains a plurality of magnetic elements that are disposed radially around a center point of the hinge 802A.

The plurality of magnetic elements within hinge 802A may hold a component of a computing device in tension by a magnetic force at positions of the magnetic elements of the hinge. For example, in views 804A, 806A the two magnetic elements 816A hold hinge 802A at an angle of 90 degrees. In views 808A, 810A, two magnetic elements 818A hold hinge 802A at 180 degrees. In views 812A, 814A, magnetic elements 820A hold hinge 802A at 205 degrees. Each pair of magnetic elements 816A, 818A, 820A are held in tension by a corresponding pair of magnetic elements 102 in one side of the hinge. In some examples, the magnetic elements 102 may be a single ferromagnetic strip. In some examples, the magnetic force between the two magnetic elements may be adjustable. An adjustable magnetic force may allow for a variable torque to be used to adjust between the angles. For example, a user may adjust the torque necessary to adjust between the angles according to his or her preferences. Embodiments as herein described may therefore be said to provide for a frictionless variable torque.

Figure 8B:
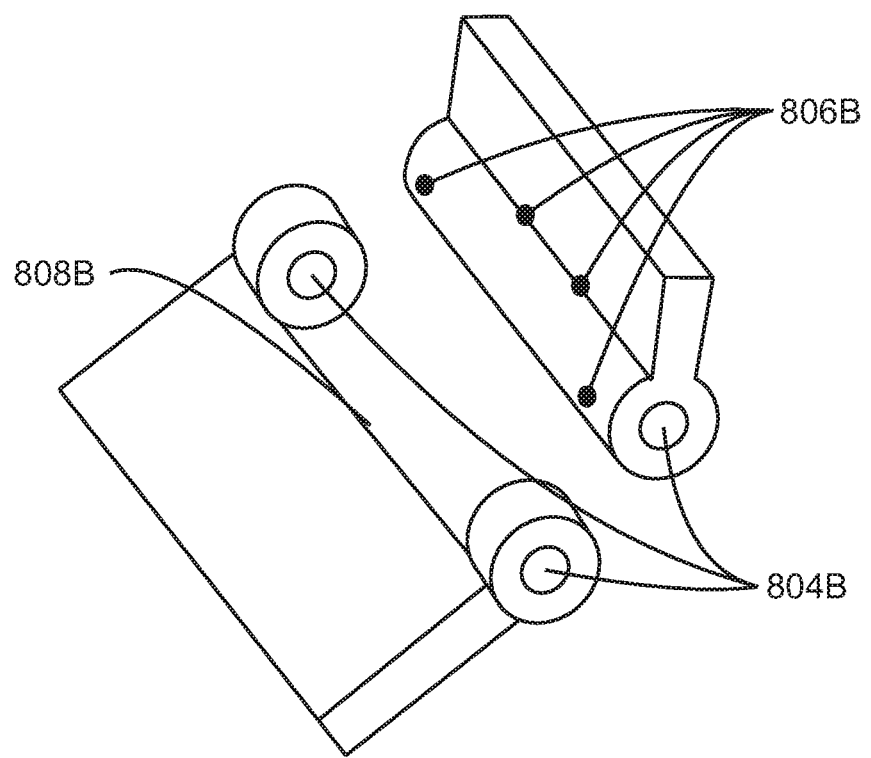
FIG. 8B is an example barrel hinge for frictionless rotation.

FIG. 8B is an example barrel hinge 802B for frictionless rotation. Barrel hinge 802B includes two components that have loops 804B to hold a rod (not shown) to hold the hinge 802B together. An inner component of hinge 802B contains magnetic elements 806B. An outer component of hinge 802B contains a magnetic element 808B. In some examples, the magnetic element 808B may be a relatively inexpensive steel strip. In some examples, magnetic element 808B may be a corresponding set of magnets that line up with the horizontal placement of magnetic elements 806B as they rotate into a magnetic attachment.

When using a barrel hinge 802B, computing technology and components may be placed within the rod or barrel of the hinge. For example, a wireless technology may be included in barrel hinge 802B allowing wireless communication between two components of a computing device connected via hinge 802B. In some cases, the barrel design can be considered bulky and a slimmer design may be used.

Figure 8C:
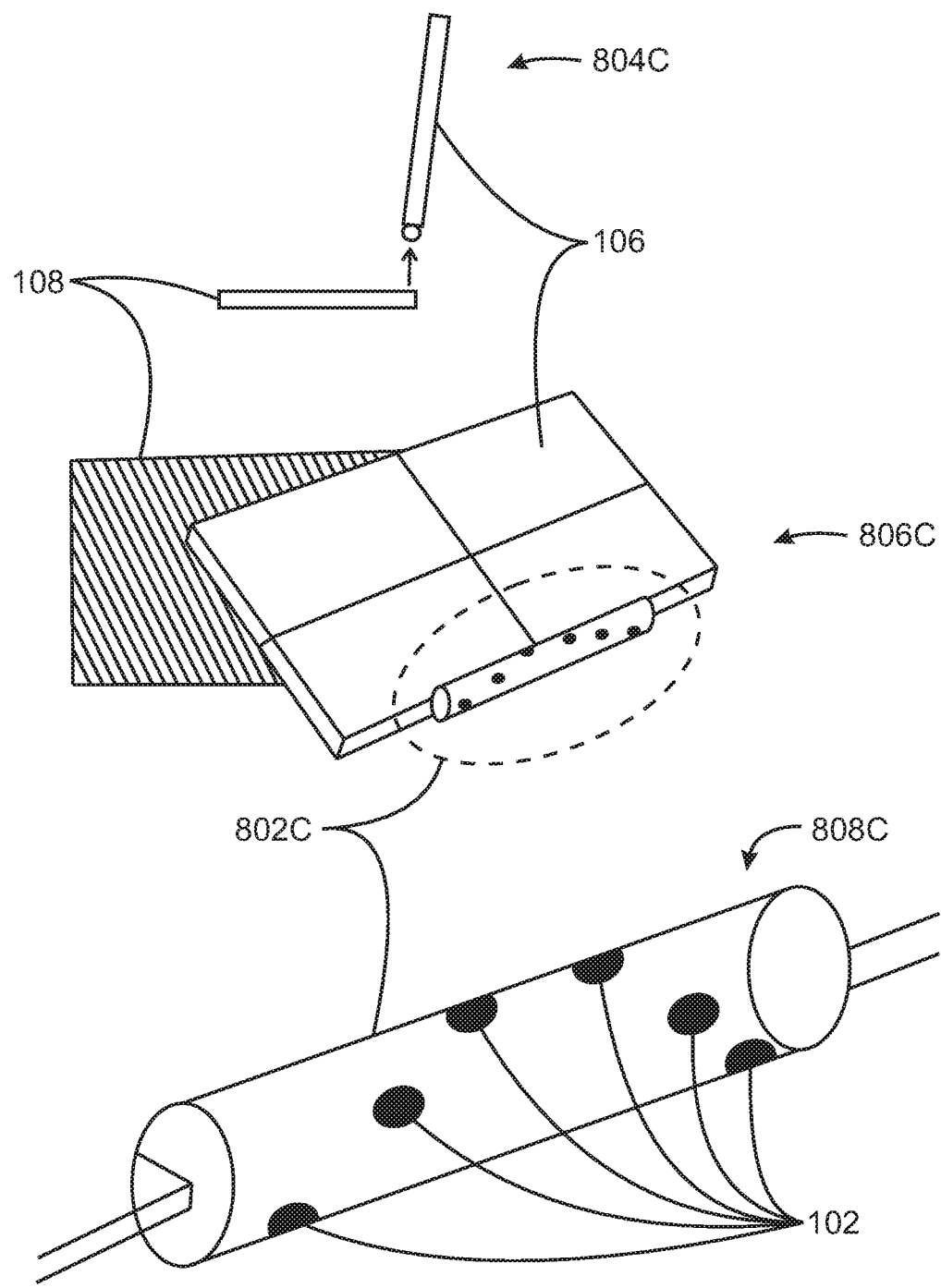
FIG. 8C is an example magnetic attachment mechanism for frictionless rotation and detachment of a tablet using a spine with magnetic elements.

FIG. 8C is an example magnetic attachment mechanism for frictionless rotation and detachment of a tablet 106 using a spine 802C with magnetic elements 102. The particular configuration of the hinge in FIG. 8C is referred to generally by the reference number 800C.

FIG. 8C includes three views 804C, 806C, 808C of the example spine 802C. In view 804C, a side perspective shows that tablet 106 may be removable from a keyboard 108. In view 806C, spine 802C is shown from a top view disconnected from keyboard 108 underneath. In view 808C, a larger close-up view of the spine 802C shows that spine 802C includes a plurality of magnetic elements 102 that are located radially around a center line and along the length of the spine 802C.

In the example of FIG. 8C, the plurality of magnetic elements may hold the tablet 106 component of the computing device in tension by a magnetic force at positions of the magnetic elements 102 of the hinge. For example, the magnetic elements 102 may be located on spine 802C such that the tablet may be positioned and magnetically held at 90, 125, and 180 degrees from the closed position. The closed position is when the tablet is flat against the keyboard 106. In view 808C, for example, the magnetic elements are disposed at different points along a length of the hinge and at differing degrees radially. The magnetic elements 102 may also fasten to a second set of magnetic elements 104 to attach the hinge to the component of a computing device as discussed below and illustrated in FIG. 8D. For example, magnets in the second plurality of magnetic elements 102 may each have polarity opposite with respect to a magnetic element 104 of another computing device component. In the example of 800C, this computing device component is tablet 106. In some examples, keyboard 106 may have rollers (not shown) for the spine 802C to rotate on. In some examples, any of the described adjustment mechanisms of FIGS. 1-4 may be used to aid in detachment of tablet 106 from keyboard 108.

A benefit of using a spine 802C is a less bulky design than the barrel hinge and no need for the use of a removable rod. However, in some cases a design may be preferred without any magnets facing outwardly on the tablet 106. For example, FIG. 8D introduces an embodiment with magnetic elements 102 facing inward on tablet 106.

Figure 8D:
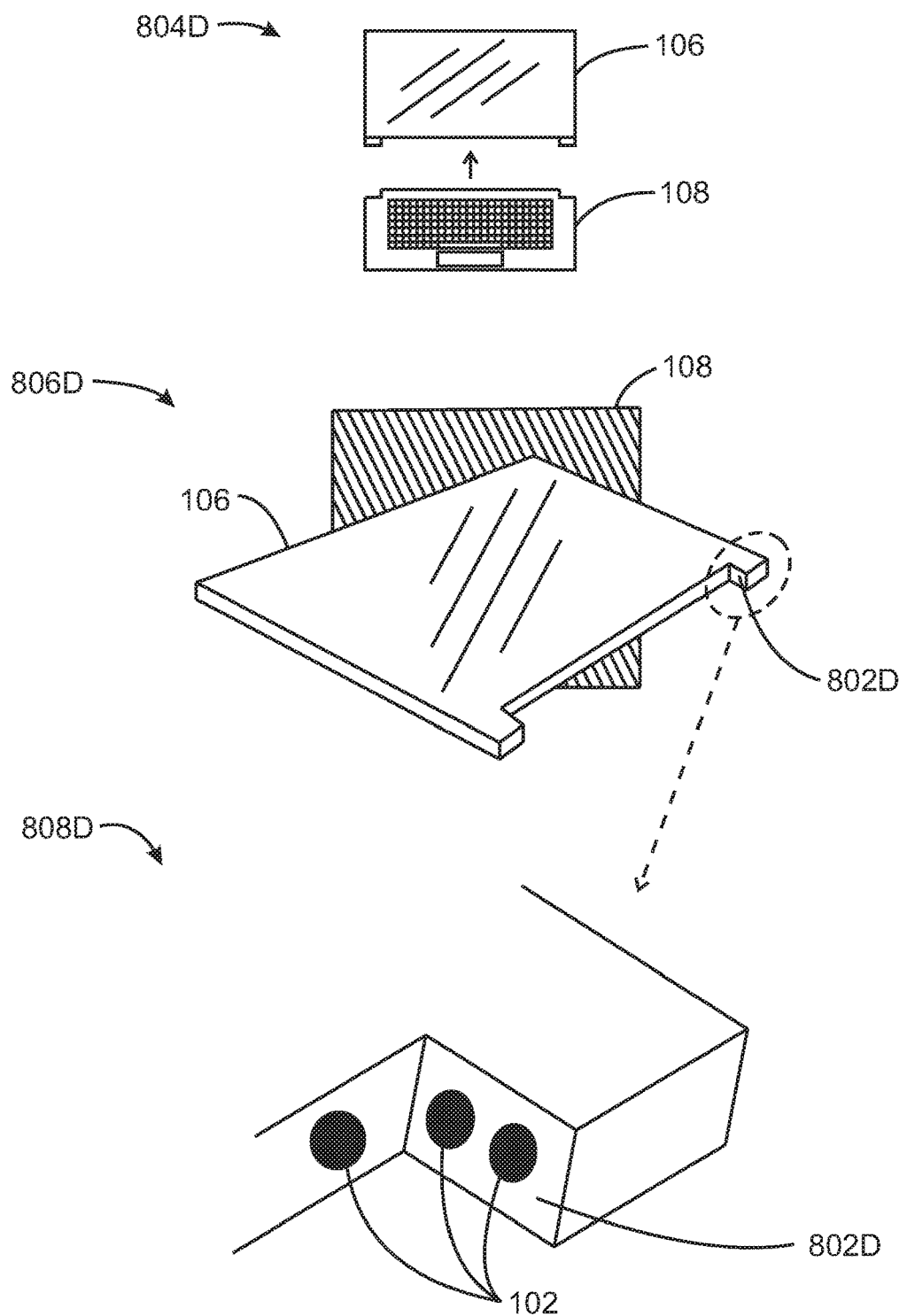
FIG. 8D is an example hingeless attachment and detachment mechanism for frictionless rotation of a tablet with magnetic elements.

FIG. 8D is an example hingeless attachment and detachment mechanism for frictionless rotation of a tablet with magnetic elements. The particular configuration of the hinge in FIG. 8D is referred to generally by the reference number 800D.

FIG. 8D includes three views 804D, 806D, 808D of an example hingeless magnetic attachment mechanism. In view 804D, a side perspective shows that tablet 106 may be removable from a keyboard 108 and is attached at two ends of keyboard 108. In view 806D, tablet 106 is shown from a top perspective disconnected from keyboard 108 underneath. In view 808D, a close-up of the hingeless connection 802D shows that connection 802D includes a plurality of magnetic elements 102 that are located on the inner sides of tablet 106. A pair of magnetic elements 102 are horizontally facing another pair of magnetic elements 102 on the other side (not shown) of the attachment of tablet 106, and another pair of magnetic elements 102 face downward on the bottom side of tablet 106.

In the example of 800D, the magnetic elements 102 may allow the tablet 106 to be held at 90, 125, or 180 degrees relative to the closed position. Corresponding magnetic elements within keyboard 108 may attach and detach from the magnetic elements 102 as a user rotates tablet 106 relative to a magnetic attachment axis. Additional magnetic elements 102 may be located along the bottom side of the tablet 106. For example, in hingeless connection 800D, magnetic elements 102 on the bottom side of tablet 106 may allow the tablet to be held at a 180 degree angle from the closed position. In some examples, the magnetic force attaching magnetic elements 102 to corresponding magnetic elements in keyboard 108 may be reduced or eliminated to allow detachment of the tablet 106 from the keyboard 108. In some examples, the tablet 106 may be detached electronically via an electromagnet. In some examples, the tablet 106 may be detached electronically via an electromechanical mechanism.

Figure 8E:
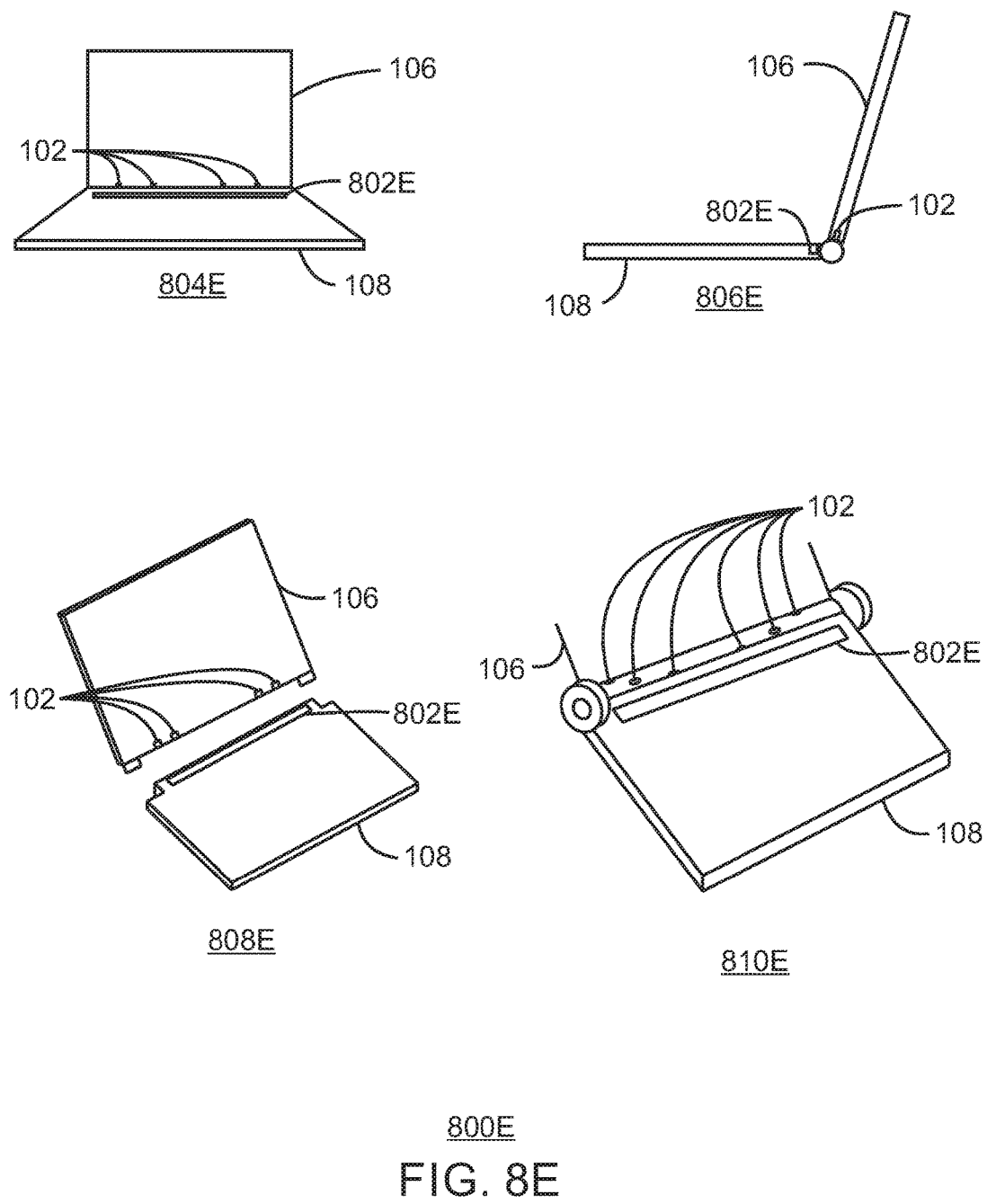
FIG. 8E is an example metal strip for use in hingeless attachment and detachment mechanism for frictionless rotation of a tablet with magnetic elements.

FIG. 8E is an example metal strip 802E for use in hingeless attachment and detachment mechanism for frictionless rotation of a tablet with magnetic elements. FIG. 8E includes four views 804E, 806E, 808E and 810E. In view 804E, a front perspective shows metal strip embedded into base 108. In view 806E, a side perspective shows metal strip 802E attaching to magnetic element 102. In view, 808E a top perspective shows computing device component 106 being removed from computing device component 108. In view 810E, a close-up shows magnetic hinge 800C using the metal strip 802E to attach component 106 to component 108 of a computing device.

In the example of 800E, a metal strip 802E may allow a tablet 106 to be held at different angles relative to the base 108. For examples, the tablet 106 may be held at 90, 125, or 180 degrees relative to the closed position. The metal strip 802E within base 108 may attach and detach from the magnetic elements 102 as a user rotates tablet 106 relative to a magnetic attachment axis. In some examples, the magnetic force attaching magnetic elements 102 to corresponding magnetic elements in keyboard 108 may be reduced or eliminated to allow detachment of the tablet 106 from the keyboard 108. In some examples, the tablet 106 may be detached electronically via an electromagnet that neutralizes the magnetic force of magnetic elements 102. In some examples, the tablet 106 may be detached electronically via an electromechanical mechanism.

A variety of advantages may be enjoyed from embodiments as described herein. As a frictionless hinge does not have contact or abrasion to establish angles, the hinge does not wear out or expire over time. In addition, the angular intervals and adjustment remain constant. For example, a slight nudge would not change the angular interval from 90 degrees to 92 degrees. Another advantage stems from the use of less parts to make the hinge, and the corresponding savings in manufacturing time and effort. The efficiency in size provides an advantage of more space that may be utilized for other purposes. This space can be used to house extra features and components. For example, wireless technologies using radio or light signals may be installed and properly aligned using discrete angles and points of constant contact on the ends of the hinge. In some examples, the tablet 106 may be communicate with keyboard 108 through such wireless technologies. Furthermore, the frictionless variable torque may be customizable in real time, and by the user or an original equipment manufacturer (OEM). Ease of detachability is another advantage stemming from customizable magnetic forces that may aid the user in removing or attaching a component to the magnetic hinge. In some examples, as discussed below, the customizable magnetic forces may be switched between different states by a user through a GUI or automatically via internal logic of the computing device.

Moreover, the attachment and detachment forces of elements 102 to corresponding elements in keyboard 108, or the attachment and detachment of component 106 to and from component 108, may be adjusted through any of the magnetic adjustment mechanisms of FIGS. 1-4 discussed at greater length above. For example, the translation of magnetic elements 102 may be used to allow a user to adjust tablet 106 from one discrete angle such as 125 degrees to another such as 90 degrees. In addition, the magnetic adjustment mechanism of FIGS. 1-4 may be used to keep the tablet 106 in a closed position relative to keyboard 108 as discussed in greater length in FIGS. 9-11 below.

Figure 9:
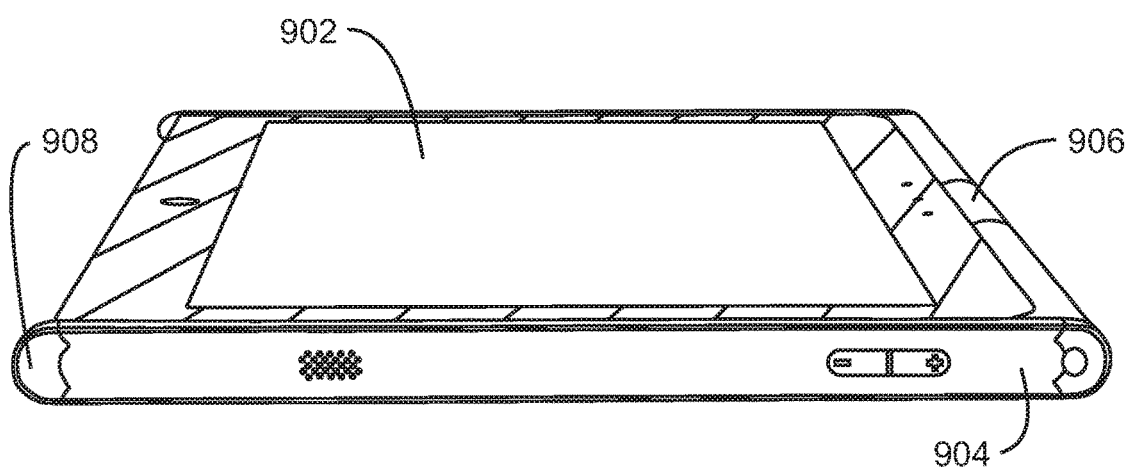
FIG. 9 is a side perspective view of an example computing device having a sliding displacement mechanism to be applied to magnetic elements.

FIG. 9 is a side perspective view of an example computing device having a sliding displacement mechanism to be applied to magnetic elements. The computing device 900 includes a first component, such as a lid 906, and a second component, such as a base 904. The computing device 900 may also include a displacement mechanism, such as a button 906, as illustrated in FIG. 9. In embodiments, the computing device 900 includes a hinge 908. The hinge 908 may allow rotational movement of the lid 902 with respect to the base 904. Although FIG. 9, as well as FIG. 10 and FIG. 11 illustrate a laptop computer having a lid and a base, the techniques described herein may be implemented in other types of computing devices, as well as in other types of components of a computing device.

Figure 10:
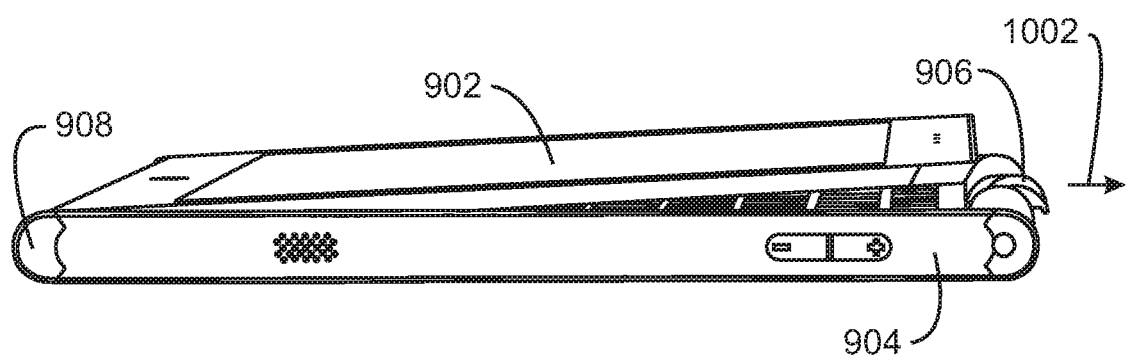
FIG. 10 is a side perspective view of an example computing device having a sliding displacement mechanism applied to magnetic elements to open a lid of the computing device.
Figure 11:
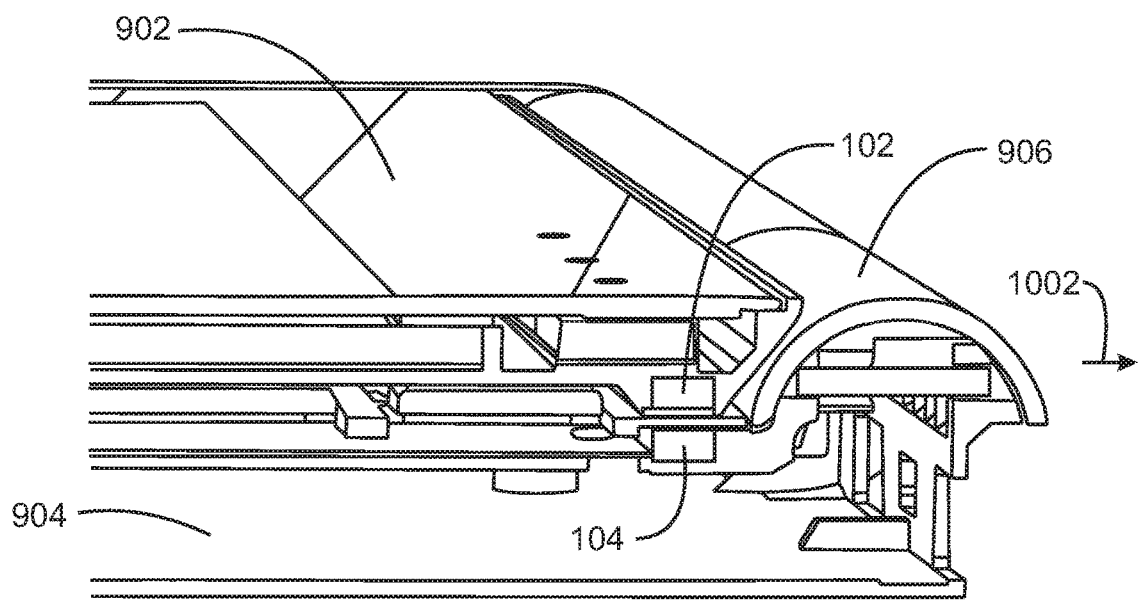
FIG. 11 is a side perspective view of a cross section of an example sliding displacement mechanism to be applied to magnetic elements to open a lid of a computing device.

FIG. 10 is a side perspective view of an example computing device having a sliding displacement mechanism applied to magnetic elements to open a lid of the computing device. The button 906 may be moveable as indicated by the arrow 1002. The button 906 may enable the lid 902 to open, as illustrated in FIG. 10. In embodiments, the computing device 900 may exhibit spring back. Spring back may be a frictional force at the hinge 908 wherein, once the button is moved at 1002, the lid may spring open at least slightly. In some embodiments, the spring back may also be a tension of the lid 902 wherein the lid may have a potential energy due to the flexibility, or bendability, of the lid 902 when the lid is closed as in FIG. 9. In either embodiment, the movement of the button 906 as indicated by 1002 enables the lid 902 to open relative to the base 904. As discussed above, the movement of the button 906 initiates a sliding motion between magnetic elements resulting in a reduction or elimination of magnetic force between the magnetic elements of the computing device.

In embodiments, the force required to move the magnetic elements apart is indicated by Equation 1:

$$F = \mu \times P + \text{Spring} \qquad \text{Eq. 1}$$

In Equation 1, the applied force is represented by "F," wherein μ is a frictional coefficient of moving one of the magnetic elements, "P" is the magnetic force between the magnetic elements, and "Spring" is the force required to return the mechanism to its original position in certain implementations after it has been displaced. In some embodiments, the force required to move the magnetic elements apart may include additional factors such as a magnetic resistance to the movement, a magnetic force occurring between a magnetic element and other metal parts of the computing device, and the like. In some embodiments, materials may be used to decrease friction in moving the magnetic elements. For example, a plastic material may be used between the magnetic elements to reduce friction between the magnetic elements.

FIG. 11 is a side perspective view of a cross section of an example sliding displacement mechanism to be applied to magnetic elements to open a lid of a computing device. The cross section 1100 of the computing device illustrates a first magnetic component and a second magnetic component, such as the first magnetic component 102 and the second magnetic component 104 discussed above in reference to FIG. 1. The first magnetic component 102 may be disposed within the lid 902 of the computing device 900, and the second magnetic component 104 may be disposed in the base 904 of the computing device 900. In embodiments, computing device may include a displacement mechanism, such as button 906. As indicated by the arrow 1002, a displacing force may be introduced between the first and second magnetic components 102, 104 when the button 906 is moved in the direction of the arrow 1002. As discussed above, the introduction of displacement between the magnetic components 102, 104 may ultimately reduce the magnetic force between the magnetic components 102, 104, and the lid 902 may spring back relative to the base 904. Although FIG. 11 illustrates the displacement mechanism as a button, other mechanisms may be possible. For example, the displacement mechanism may be a scrolling mechanism configured to enable a user to move one or more of the magnetic components 102, 104 laterally and parallel to an edge of the computing device 900.

As previously discussed, a benefit of the lateral displacement mechanism may involve saving space in the orthogonal direction and/or introducing more preferable force-displacement characteristics. However, any of the previous described magnetic attachment mechanisms of FIGS. 5-11 may be configured such that the magnetic force is adaptable to the preferences of the user. In some examples, a user may be able to manually adjust the magnetic forces through configuration of the adjustment mechanism. In some examples, the adjustment mechanism includes an automatic adjustment feature that automatically adjusts the magnetic force between magnetic elements 102, 104 to the usage of the user as described in greater detail in FIG. 13. In these examples, an electromechanical or electromagnetic mechanism may be preferred to allow for automation as discussed in greater detail below.

Figure 12:
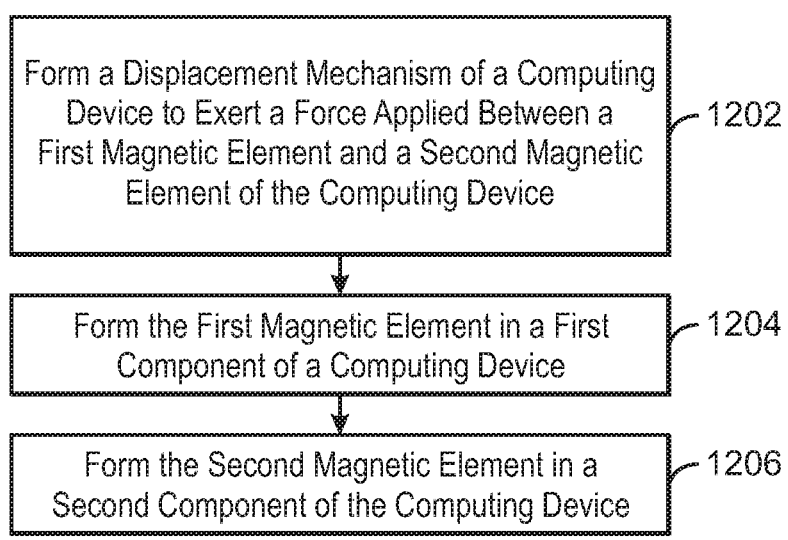
FIG. 12 is a block diagram illustrating a method of forming a displacement mechanism of a computing device.

FIG. 12 is a block diagram illustrating a method of forming a displacement mechanism of a computing device. The method 1200 includes forming, at block 1202, a displacement mechanism of a computing device to exert a force applied between a first magnetic element and a second magnetic element of the computing device. The first magnetic element is held in tension to the second magnetic element by a magnetic force between the first magnetic element and the second magnetic element.

The method 1200 may include additional embodiments. In some embodiments, the method 1200 may include forming, at block 1204, the first magnetic element in a first component of a computing device. For example, the first magnetic element may be formed to be disposed in a lid of a computing device such as a laptop. In embodiments, the method 1200 may include forming, at block 1206, the second magnetic element in a second component of the computing device. For example, the second magnetic element may be formed to be disposed in a base of a computing device. In either embodiment, the first magnetic element and the second magnetic element are to be held in tension by a magnetic force, and are to be separable by a force applied to either magnetic element by the displacement mechanism. As discussed above, the displacement mechanism may be, in one embodiment, a button to be slideably engaged to introduce a force. In some embodiments, both of the magnetic elements are magnets. However, in other embodiments, one of the magnetic elements is a magnet, while the other magnetic element is a ferromagnetic material, or a ferrimagnetic material, such as steel, but is not a magnet. In yet another embodiment, both of the magnetic elements are magnets and one or more of the magnetic elements may include a metal backplate. In this embodiment, the metal backplate may increase the magnetic force between the magnetic components relative to other embodiments.

Figure 13:
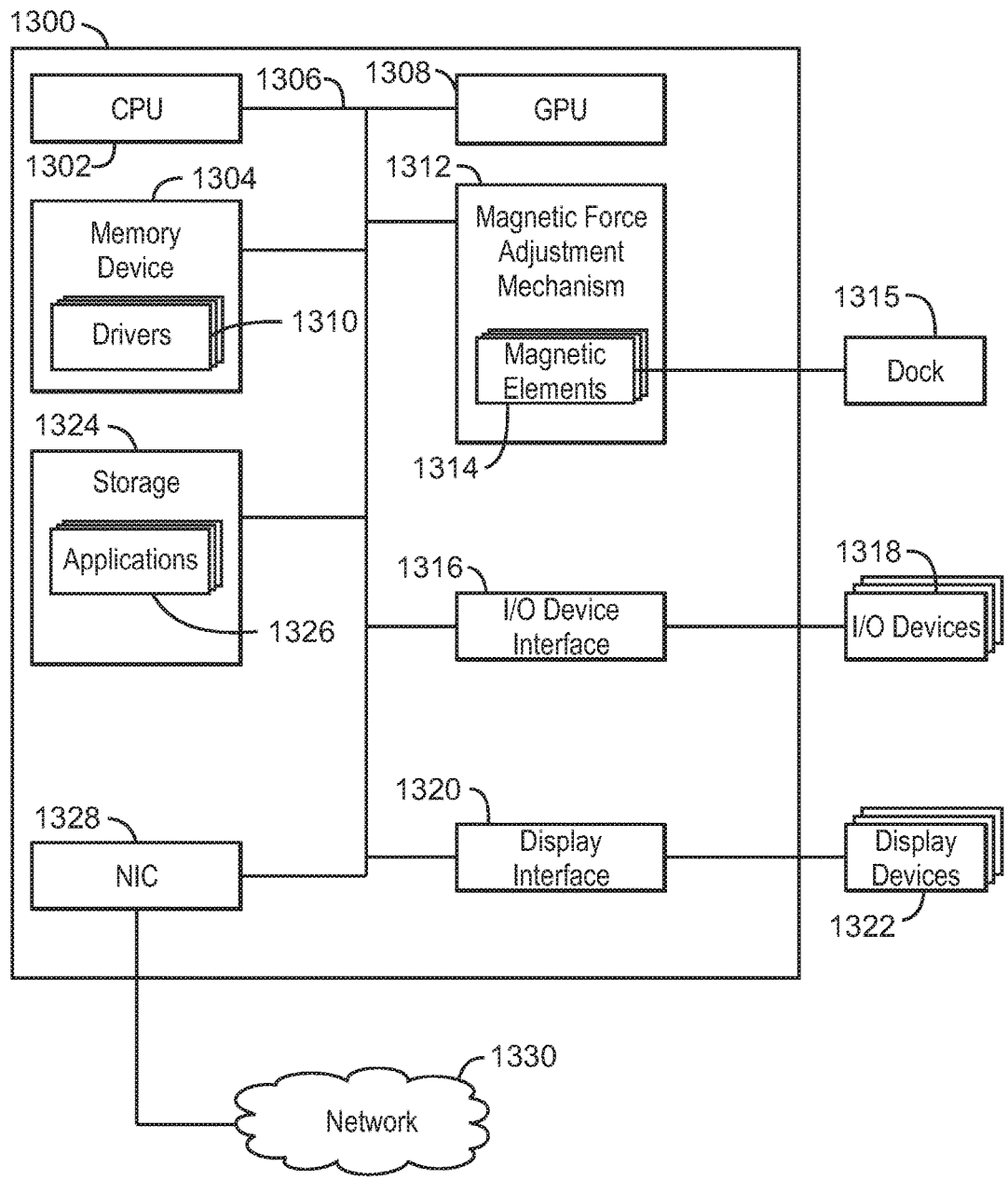
FIG. 13 is block diagram of a component of a computing device with adjusting magnetic force.

FIG. 13 is block diagram of a component of a computing device with adjusting magnetic force. The computing device 1300 may be, for example, a laptop, two-in-one detachable laptop, tablet computer, or convertible, among others. The computing device 1300 may include a central processing unit (CPU) 1302 that is configured to execute stored instructions, as well as a memory device 1304 that stores instructions that are executable by the CPU 1302. The CPU may be coupled to the memory device 1304 by a bus 1306. Additionally, the CPU 1302 can be a single core processor, a multi-core processor, a computing cluster, or any number of other configurations. Furthermore, the computing device 1300 may include more than one CPU 1302. The memory device 1304 can include random access memory (RAM), read only memory (ROM), flash memory, or any other suitable memory systems. For example, the memory device 1304 may include dynamic random access memory (DRAM).

The computing device 1300 may also include a graphics processing unit (GPU) 1308. As shown, the CPU 1302 may be coupled through the bus 1306 to the GPU 1308. The GPU 1308 may be configured to perform any number of graphics operations within the computing device 1300. For example, the GPU 1308 may be configured to render or manipulate graphics images, graphics frames, videos, or the like, to be displayed to a user of the computing device 1300. The memory device 1304 can include random access memory (RAM), read only memory (ROM), flash memory, or any other suitable memory systems. For example, the memory device 104 may include dynamic random access memory (DRAM). The memory device 1304 may include a device driver 1310 that is configured to execute the instructions for adjusting magnetic attachment and detachment forces. The device driver 110 may be software, an application program, application code, or the like.

The computing device 1300 includes a magnetic force adjustment mechanism 1312. In embodiments, the magnetic force adjustment mechanism 1312 is an electromechanical or electromagnetic mechanism as described in FIGS. 1-4. For example, the magnetic force adjustment mechanism 1312 may include, but is not limited to, a motor, piezo motor, electromagnetic coil, linear actuator, shape memory alloy actuator, or any combinations thereof. The magnetic force adjustment mechanism 1312 is used to change attachment or detachment forces between the computing device 1300 and another computing component at a dock 1315. Dock 1315 may be a magnetic hinge 1315, or any other adjustable point of magnetic attachment between two components of computing device 1300. Accordingly, the computing device 1300 also includes one or more magnetic elements 1314. In examples, a magnetic element 1314 may be a magnet 114. In some examples, magnetic element 1314 may be an electromagnet 1314. The magnet 1314 may be displaced by magnetic force adjustment mechanism 1312 to increase or decrease the magnetic force between computing device 1300 and another component of a computing device at dock 1315. In some embodiments, a driver 1310 may be used to operate the magnetic force adjustment mechanism 1312 and shift the magnetic elements 1314. In some examples, the driver 1310 may be used to operate the magnetic force adjustment mechanism 1312 and power an electromagnetic element 1314. For example, the driver 1310 may cause an electromagnetic element 1314 to power on to reduce magnetic force at dock 1315 for a detachment. Additionally, in examples, the magnetic elements 1314 may be a plurality of magnetic elements. In some examples, magnetic elements 1314 may be arranged in a carriage that may be adjusted by magnetic force adjustment mechanism 1312. In some examples, magnetic elements 1314 may be individually adjustable. The device driver 110 may represent magnetic element orientation or magnetic force in numbers or states of attachment that are accessible to users.

The CPU 1302 may also be connected through the bus 1306 to an input/output (I/O) device interface 1316 configured to connect the computing device 1300 to one or more I/O devices 1318. The I/O devices 1318 may include, for example, capacitive touch surfaces, pressure sensors, accelerometers, and/or gyroscopes, among others. The I/O devices 1318 may be built-in components of the computing device 1300, or may be devices that are externally connected to the computing device 1300. In some examples, accelerometers 1318 may be two or more accelerometers that are built into the computing device. For example, one accelerometer may be built into each surface of a detachable laptop.

The CPU 1302 may also be linked through the bus 1306 to a display interface 120 configured to connect the computing device 1300 to a display device 1322. The display device 1322 may include a display screen that is a built-in component of the computing device 1300. The display device 1322 may also include a computer monitor, television, or projector, among others, that is externally connected to the computing device 1300.

The computing device also includes a storage device 1324. The storage device 1324 is a physical memory such as a hard drive, an optical drive, a thumbdrive, an array of drives, or any combinations thereof. The storage device 1324 may also include remote storage drives. A number of applications 1326 may be stored on the storage device 1324. The applications 1326 may include an attachment and detachment force adjustment application. The applications 1326 may be used to adjust the torque required to move a display between different angles of a magnetic hinge 1315. In some examples, the depth map may be formed from the environment captured by the image capture mechanism 1312 of the computing device 1300. In some examples, the applications 1326 may be used to preset different states of magnetic force operation.

In some examples, beam forming is used to capture multi-channel audio data from the direction and distance of a targeted speaker. The multi-channel audio data may also be separated using blind source separation. Noise cancellation may be performed when one or more channels are selected from the multi-channel audio data after blind source separation has been performed. In addition, auto echo cancellation may also be performed on the one or more selected channels.

The computing device 1300 may also include a network interface controller (NIC) 1328. The NIC 1328 may be configured to connect the computing device 1300 through the bus 1306 to a network 1330. The network 1330 may be a wide area network (WAN), local area network (LAN), or the Internet, among others.

The block diagram of FIG. 13 is not intended to indicate that the computing device 1300 is to include all of the components shown in FIG. 13. Rather, the computing system 1300 can include fewer or additional components not illustrated in FIG. 13 (e.g., sensors, power management integrated circuits, additional network interfaces, etc.). The computing device 1300 may include any number of additional components not shown in FIG. 13, depending on the details of the specific implementation. Furthermore, any of the functionalities of the CPU 1302 may be partially, or entirely, implemented in hardware and/or in a processor. For example, the functionality may be implemented with an application specific integrated circuit, in logic implemented in a processor, in logic implemented in a specialized graphics processing unit, or in any other device.

Figure 14:
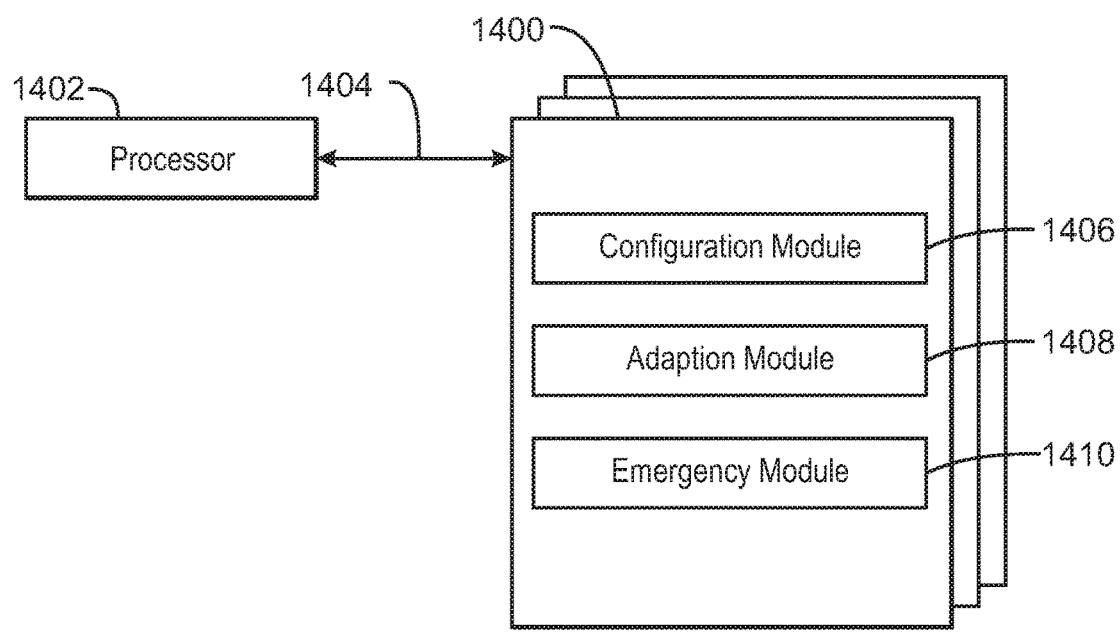
FIG. 14 is a block diagram showing tangible, machine-readable media that store code for adjusting magnetic force.

FIG. 14 is a block diagram showing tangible, machine-readable media that store code for adjusting magnetic force. The tangible, machine-readable media 1400 may be accessed by a processor 1402 over a computer bus 1404. Furthermore, the tangible, machine-readable medium 1400 may include code configured to direct the processor 1402 to perform the methods described herein. In some embodiments, the tangible, machine-readable media 1400 may be non-transitory.

The various software components discussed herein may be stored on one or more tangible, machine-readable media 1400, as indicated in FIG. 14. For example, a configuration module 1406 may be configured to allow the customization of magnetic forces in a computing component. In some examples, the tracking module 1406 may allow a user to change magnetic attachment and detachment forces via a GUI. In some examples, the tracking module 1406 may allow the user to change magnetic attachment and detachment forces through a button on a computing component. An adaptation module 1408 may be configured to receive a plurality of sensory input from the computing component. In some examples, the adaptation module 1408 adjusts a magnetic attachment force based on the sensory input. For example, the adaptation module 1408 may raise the attachment force when sensory input indicates an inadvertent or premature detachment of the computing component from another component of a computing device. The adaptation module 1408 may, for example, lower the detachment force when sensory input indicates one or more failed attempts to detach the computing component from another computing component of the computing device. An emergency module 1410 may be configured to temporarily change the magnetic force under certain conditions. In some examples, the emergency module 1410 may temporarily raise the attachment force when sensory input indicates the computing device is falling.

The block diagram of FIG. 14 is not intended to indicate that the tangible, machine-readable media 1400 is to include all of the components shown in FIG. 14. Further, the tangible, machine-readable media 1400 may include any number of additional components not shown in FIG. 14, depending on the details of the specific implementation.

Figure 15:
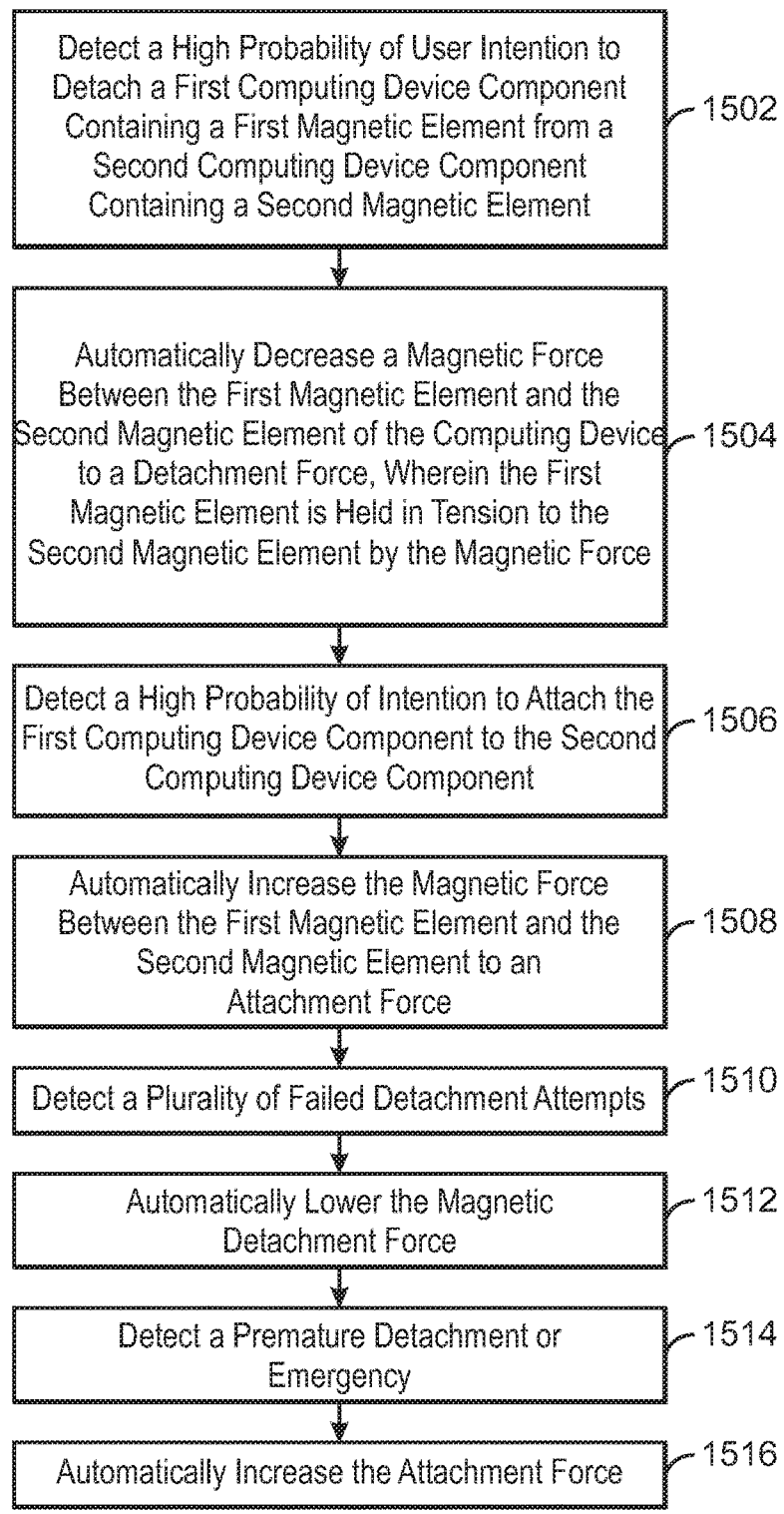
FIG. 15 is a block diagram illustrating a method of automatically adjusting a magnetic force in a computing device.

FIG. 15 is a block diagram illustrating a method of automatically adjusting a magnetic force in a computing device. The method 1500 may include detecting, at block 1502, a high probability of user intention to detach a first computing device component containing a first magnetic element from a second computing device component containing a second magnetic element. The first magnetic element is held in tension to the second magnetic element by a magnetic force between the first magnetic element and the second magnetic element. In some examples, the high probability of detachment intention may be sensed, for example, by the touch of a button on component. For example, a user may press a button or press and hold a button for a specific amount of time. In some examples, a capacitive surface may trigger a high probability of detachment intention. For example, the touch of a finger on the capacitive touchscreen or a capacitive surface on the back of a tablet may indicate a high probability of detachment intention. In some examples, the probability of detachment intention may take into account the specific orientation of the computing device. For example, a gyro or accelerometer may detect movement to an orientation that would indicate a high probability of detachment intention.

At block 1504, the method may include automatically decreasing a magnetic force between the first magnetic element and the second magnetic element of a computing device to a detachment force, wherein the first magnetic element is still held in tension to the second magnetic element by a magnetic force between the first magnetic element and the second magnetic element. The detachment force may allow a user to easily detach the first computing device component from the second device component. In embodiments, the attachment force may be changed to the detachment force by any of the mechanisms previously discussed above. In some examples, the detachment force may include a repelling force as described in FIGS. 2 and 4 above. In some examples, logic within the computing device may receive an indication that a user is about to detach a component. The logic would then cause the magnetic force to switch to a detachment force upon receiving the indication of a high probability of user detachment intention.

At block 1506, the method may include detecting a high probability of user attachment of the first computing device component to the second computing device component. The high probability of attachment may be sensed, for example, by a motion sensor, a magnetic field sensor, or the like. In some examples, the sensor may communicate with logic of a computing system to indicate a user is about to attach the first component of the computing device to the second component of the computing device. For example, the sensor may communicate with power management logic of the computing device to receive user input and adjust attachment and detachment forces accordingly.

At block 1508, the method may include automatically increasing the magnetic force between the first magnetic element and the second magnetic element to an attachment force. In embodiments, the attachment force may be achieved by any of the mechanisms discussed at length above. In some examples, the attachment force may automatically be switched to a preset attachment force by logic within the computing system. In some examples, the preset attachment force may be user configurable and/or customizable. For example, a user may adjust the attachment force by using a GUI that runs in the operating system of the computing device.

At block 1510, the method may include detecting a plurality of failed detachment attempts. A failed detachment attempt may be, for example, a user attempt to remove a component as measured by changes in the magnetic field or a movement sensor such as an accelerometer. In some examples, a pressure sensor or capacitive touch sensor may be used to detect a failed detachment attempt. For example, the sensor may detect a user touching a capacitive surface and this may be combined with detected force at the magnetic elements to count as a failed detachment attempt.

At block 1512, the method may include automatically lower the magnetic detachment force. In embodiments, the detachment force may be reduced by logic in the computing device in response to a predetermined number of failed detachment attempts. In some examples, this lower detachment force setting may be stored for future use. For example, the lower detachment force may be permanently lowered until premature detachments are detected. In some examples, the detachment force may be reconfigured by the user via a GUI or other interface. For example, a GUI may present a user with a slider bar to visually adjust or reset the detachment force.

At block 1514, the method may include detecting a premature detachment. A premature detachment is when one computing device component separates from the other without a corresponding detected user action. A user action may be detected by capacitive touch screen, proximity sensor, or the like. For example, the computing device may be in a moving vehicle or a backpack. The computing device may experience sudden motions that cause one computing device component to detach from the other computing device component. A detachment without any detected user interaction may be counted as a premature detachment. For example, a premature detachment may be counted when one computing device component detaches from another without any capacitive touch detected. In some examples, an emergency situation may be detected. For example, an emergency situation may exist when an accelerometer of the computing device senses the computing device is falling.

At block 1516, the method may include automatically raising the attachment force. In embodiments, the attachment force setting may be increased in response to premature detachment by logic in the computing device. In some embodiments, the attachment force may be increased when a premature detachment is detected. In some embodiments, the attachment force may be increased after a predetermined number of premature detachments. In some embodiments, the attachment force may be raised temporarily. In some examples, an emergency situation may be detected and the logic may temporarily raise the attachment force setting. For example, an emergency situation may exist when an accelerometer of the computing device senses the computing device is falling. The logic may cause the attachment force to temporarily increase to reduce the risk of damage to the computing device upon receiving the fall indication from the accelerometer.

The method 1500 may include additional embodiments. As mentioned above, logic in the device may also allow the computing device to adapt the magnetic force to the preferences of a user. In some examples, this logic may include hardware logic to control the adjustment mechanism. For example, the method may be implemented by a controller connected to a power management processor. In some embodiments, the computing device may automatically adapt the default attachment and detachment forces, or maximum and minimum magnetic forces used, by storing and analyzing historical information of failed attempts and premature detachments and other user behaviors. In some embodiments, the logic controlling the detachment and the attachment forces may be user programmable and/or customizable. For example, a user may specify or change the threshold for a failed detachment attempt, a premature detachment, or an emergency. The user may also set or reset a default attachment or detachment force through, for example, a GUI slider bar.

EXAMPLE 1

An apparatus for adjustable magnetic coupling is described herein. The apparatus includes a first magnetic element in an attachment surface of a first component of a computing device to be coupled to a second magnetic element of a second component of the computing device via a magnetic force. The apparatus further includes an adjustment mechanism to adjust the magnetic attachment force. The first magnetic element of the apparatus can be a magnet and the adjustment mechanism can be a mechanical component that is to adjust the magnetic force by displacing the first magnetic element relative to the second magnetic element. The apparatus can include a rod within the first component of a computing device coupled to a carriage having the first magnetic element disposed thereon. The mechanical component can be a chamfered edge to be received at a chamfered edge of the rod. The first magnetic element can be displaced relative to the second magnetic element by the force of the camfered edge sliding into the camfered edge of the rod. The mechanical component can be a linear actuator to be engaged to adjust the magnetic force by displacing the first magnetic element relative to the second magnetic element through a direction not aligned with the field of magnetic attraction. The mechanical component comprises a manual adjustment knob to be engaged to adjust the magnetic attachment force by displacing the first magnetic element relative to the second magnetic element through a direction not aligned with the field of magnetic attraction. The apparatus can include a motor to move the mechanical component. The mechanical component can include a shape memory alloy actuator to displace the first magnetic element from the second magnetic element parallel to the magnetic force. The mechanical component can include a rod connected to the first magnetic element. The rod can be rotated to adjust the magnetic force via orientation of the polarity of the first magnetic element relative to the second magnetic element. The second magnetic element can be an electromagnet. The adjustment mechanism can power the electromagnet to temporarily reduce or reverse the magnetic attachment force. The first magnetic element can include a plurality of magnetic components that can move through a mechanism in opposite directions to neutralize magnetic misalignment forces of the computing component.

EXAMPLE 2

A hinge for magnetic coupling is herein described. The hinge includes magnetic elements that are disposed radially around a center point of the hinge. The hinge is to be built into a first component of a computing device. The magnetic elements are to hold the first component in tension at angular interval positions of the first magnetic elements relative to a second component of the computing device via a magnetic force between a subset of the magnetic elements and a magnetic element of the second component of the computing device. The magnetic elements of the hinge can be disposed at different points along a length of the hinge. The magnetic elements of the hinge can be disposed in angular intervals at the ends of the hinge. The magnetic elements of the hinge can be a first plurality of magnetic elements and the magnetic element of the second component can be a first magnetic element of the second component. The hinge can include a second plurality of magnetic elements to attach the hinge of the first component to the second component. The second plurality of magnetic elements can each have a polarity opposite with respect to a second magnetic element of the second component of the computing device. The magnetic force between the second plurality of magnetic elements of the first component and the second magnetic element of the second component can be reduced for detachment via an electromagnetic or electromechanical adjustment mechanism. The component of the computing device can be held by magnetic forces between the magnetic elements of the hinge and the magnetic element of the second component at discrete angles. The magnetic forces can be customizable via electromechanical or electromagnetic mechanisms. The hinge can also include a space within the hinge in which a wireless technology may be housed. The first component and second component can be wirelessly communicatively coupled. The hinge can include a spine on which the magnetic elements are attached. The hinge can include a barrel on which the magnetic elements are attached. The barrel can be connected to one or more loops of the second component via a removable rod. The magnetic element of the second component of the computing device can be a metal strip.

EXAMPLE 3

A method for adjusting magnetic tension forces is described herein. The method includes detecting a high probability of user intention to detach a first computing device component containing a first magnetic element from a second computing device component containing a second magnetic element. The method further includes automatically decreasing a magnetic force between the first magnetic element and the second magnetic element of the computing device to a detachment force. The first magnetic element is held in tension to the second magnetic element by the magnetic force. The method can include detecting a high probability of user intention to attach the first computing device component to the second computing device component. The method can also include automatically increasing the magnetic force between the first magnetic element and the second magnetic element to an attachment force. The method can include detecting a plurality of failed detachment attempts. The method can further include automatically lowering the magnetic detachment force. The method can include detecting a premature detachment or emergency. The emergency can be a fall detected by an accelerometer. The method can also include automatically increasing the attachment force. The detachment force and the attachment force can be user programmable. The detachment force and the attachment force can automatically adapt to the preferences of a user. The detachment force can reset back to an attachment force after a predetermined amount of time. The attachment force and detachment force can be controlled by a power management logic. The attachment force and detachment force can be adjustable through a GUI.

EXAMPLE 4

A system for adjusting magnetic coupling forces is described herein. The system includes a first magnetic element in a first component of a computing device. The system includes a second magnetic element in a second component of the computing device. The first component and the second component are to be held in tension by a magnetic force. The system further includes an adjustment mechanism to adjust a force required to decouple the magnetic elements. The system can include logic, at least partially comprising hardware logic, to control the adjustment mechanism. The first component of the computing device can include an axis about which the first magnetic element can freely swing about. The second component of a computing device can include at least two rollers on which a magnetic side of the first component of a computing device can rotate. The adjustment mechanism can include an electromagnet. The electromagnet can temporarily reduce the magnetic force between the first component of the computing device and second component of the computing device for detachment. The adjustment mechanism can include a linear actuator that can translate the first magnetic element in the first component to adjust the magnetic force between the first component and the second component. The adjustment mechanism can be controlled via a graphical user interface (GUI) switch. The adjustment mechanism can automatically switch between configurable states of magnetic force. One of the components can be a tablet, and the other component can be a base of the computing device. The tablet can be held in magnetic tension to the base by the magnetic elements. The tablet can also be articulated up to at least 120 degrees relative to the base. The first magnetic element can be a permanent magnet and the second magnetic element can be an electromagnet formed in a "U" shape. The adjustment mechanism can be controlled via power management logic.

EXAMPLE 5

An apparatus for displacing magnetic elements is described herein. The apparatus includes a displacement mechanism of a computing device to exert a force applied between a first magnetic element and a second magnetic element of the computing device. The first magnetic element is to be held in tension to the second magnetic element by a magnetic force between the first magnetic element and the second magnetic element. The apparatus can include a first component of the computing device housing the first magnetic element and a second component of the computing device housing the second magnetic element. The first magnetic element and the second magnetic element can be held in tension by the magnetic force, and can be separable by the force exerted by the displacement mechanism. One of the components can be a lid and the other component can be a base of the computing device. The lid can spring back upon being separated by the displacement mechanism. The displacement mechanism can be a button to be slideably engaged to introduce the force. One of the magnetic elements can be a magnet and the other magnetic element can be composed of a ferromagnetic material, or a ferrimagnetic material, but not a magnet. Both of the magnetic elements can also be magnets. The applied force can be perpendicular to the magnetic force. The applied force can be less the than the magnetic force. The apparatus can include a material between the first magnetic element and second magnetic element to reduction friction. The material can be made of plastic.

EXAMPLE 6

A system for separating magnetic elements is described herein. The system includes a first magnetic element in a first component of a computing device. The system includes a second magnetic element in a second component of the computing device. The first magnetic component and the second magnetic component are to be held in tension by a magnetic force. The system includes a displacement mechanism of the computing device to exert a force applied to either magnetic element to separate the magnetic elements. The displacement mechanism can be a button of the computing device to be slideably engaged to exert the force. One of the magnetic elements can be a magnet and the other magnetic element can be composed of a ferromagnetic material, or a ferrimagnetic material, but not a magnet. Both of the magnetic elements can be magnets. The exerted force can be perpendicular to the magnetic force. The exerted force can be less the than the magnetic force. One of the components can be a lid. The lid can spring back upon being separated by the displacement mechanism. The other component can be a base of the computing device. The system can include a material between the first magnetic element and second magnetic element to reduction friction. The material can be made of plastic. The computing device can be a laptop.

EXAMPLE 7

At least one tangible, machine-readable medium for adjusting magnetic tension forces is described herein. The machine-readable medium includes instructions stored therein that, in response to being executed on a computing device, cause the computing device to detect a high probability of user intention to detach a first computing device component containing a first magnetic element from a second computing device component containing a second magnetic element. The instructions also cause the computing device to automatically decrease a magnetic force between the first magnetic element and the second magnetic element of a computing device to a detachment force. The first magnetic element is held in tension to the second magnetic element by a magnetic force between the first magnetic element and the second magnetic element. The machine-readable medium can also include instructions further cause the computing device to detect a high probability of user intention to attach the first computing device component to the second computing device component. The instructions can also cause the computing device to automatically increase the magnetic force between the first magnetic element and the second magnetic element to an attachment force. The machine-readable medium can further include instructions further cause the computing device to detect a plurality of failed detachment attempts. The instructions can also cause the computing device to automatically lower the magnetic detachment force. The machine-readable medium can also include instructions further cause the computing device to detect a premature detachment or emergency. The instructions can also cause the computing device to automatically increase the attachment force. The detachment force and the attachment force can be user programmable. The detachment force and the attachment force can automatically adapt to the preferences of a user. The detachment force can reset back to an attachment force after a predetermined amount of time. The attachment force and detachment force can be controlled by a power management logic. The attachment force and detachment force can be adjustable through a graphical user interface (GUI).

EXAMPLE 8

An apparatus for adjustable magnetic coupling is described herein. The apparatus includes means for magnetically coupling a first component of a computing device to a second component of a computing device via a magnetic attachment force. The apparatus also includes means for adjusting the magnetic attachment force. The apparatus can include means for producing a repelling force. The apparatus can further include means for neutralizing magnetic misalignment forces in the first component.

EXAMPLE 9

A hinge for magnetic coupling is described herein. The hinge includes means for holding a first component of a computing device to a second component of a computing device at angular interval positions via a magnetic force. The hinge can include means for attaching the first component to the second component magnetically. The hinge can include means for reducing the magnetic force for detachment. The hinge can further include means for customizing the magnetic forces between the first component and the second component. The hinge can also include means for communicatively coupling the first component and the second component wirelessly.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An apparatus for adjustable magnetic coupling, comprising:
   a first magnetic element in an attachment surface of a first component of a computing device to be coupled to a second magnetic element of a second component of the computing device via a magnetic attachment force; and
   an adjustment mechanism to adjust the magnetic attachment force, wherein the adjustment mechanism comprises a linear actuator to move half of a plurality of magnetic components of the first magnetic element in one direction and a rest of the plurality of magnetic components of the first magnetic element in an opposite direction.

2. The apparatus of claim 1, wherein the first magnetic element of the apparatus comprises a magnet, and wherein the adjustment mechanism comprises a mechanical component that is to adjust the magnetic attachment force by displacing the first magnetic element relative to the second magnetic element.

3. The apparatus of claim 2, wherein the linear actuator is to be engaged to adjust the magnetic attachment force by displacing the first magnetic element relative to the second magnetic element through a direction not aligned with a field of magnetic attraction.

4. The apparatus of claim 2, further comprising a motor to move the mechanical component.

5. The apparatus of claim 1, wherein the first magnetic element comprises the plurality of magnetic components that are to move through the adjustment mechanism in opposite directions to neutralize magnetic misalignment forces in the first component.

6. A system for adjusting magnetic coupling forces, comprising:
   a first magnetic element in a first component of a computing device;
   a second magnetic element in a second component of the computing device, wherein the first component and the second component are to be held in tension by a magnetic force; and
   an adjustment mechanism to adjust a force required to decouple the magnetic elements, wherein the adjustment mechanism comprises a linear actuator and a gearing or linkage system to move half of a plurality of magnetic components of the first magnetic element in one direction and a rest of the plurality of magnetic components of the first magnetic element in an opposite direction.

7. The system of claim 6, further comprising logic, at least partially comprising hardware logic, to control the adjustment mechanism.

8. The system of claim 7, wherein the linear actuator is to translate the first magnetic element in the first component to adjust the magnetic force between the first component and the second component.

* * * * *